May 20, 1958 W. S. TANDLER ET AL 2,835,042

PROGRAMMING APPARATUS

Filed Aug. 21, 1956 8 Sheets-Sheet 2

INVENTOR.
WILLIAM S. TANDLER
ET AL.
BY
Campbell, Brumbaugh, Free & Graves
their ATTORNEYS May 20, 1958 W. S. TANDLER ET AL 2,835,042

PROGRAMMING APPARATUS

Filed Aug. 21, 1956 8 Sheets-Sheet 1

INVENTOR.
WILLIAM S. TANDLER ET AL.
BY
Campbell, Brumbaugh, Free & Graves
their ATTORNEYS INVENTOR.
WILLIAM S. TANDLER
ET AL.
BY
Campbell, Brumbaugh, Free & Graves
their ATTORNEYS INVENTOR.
WILLIAM S. TANDLER
ET AL.
BY
Campbell, Brumbaugh, Free & Graves
their ATTORNEYS

PROGRAMMING APPARATUS

Filed Aug. 21, 1956 8 Sheets-Sheet 5

PROGRAMMING APPARATUS

Filed Aug. 21, 1956 8 Sheets-Sheet 6

INVENTOR.
WILLIAM S. TANDLER
ET AL.
BY
Campbell, Brumbaugh, Freer & Graves
their ATTORNEYS

PROGRAMMING APPARATUS

INVENTOR
WILLIAM S. TANDLER
ET AL.
BY
Campbell, Brumbaugh, Free & Graves
their ATTORNEYS INVENTOR.
WILLIAM S. TANDLER
ET AL.
BY
Campbell, Brumbaugh, Free & Graves
their ATTORNEYS United States Patent Office 2,835,042

Patented May 20, 1958

2,835,042

PROGRAMMING APPARATUS

William S. Tandler, New York, and Morris Grossman, Brooklyn, N. Y., assignors to The Warner & Swasey Research Corporation, Cleveland, Ohio, a corporation of Ohio Application August 21, 1956, Serial No. 605,279

22 Claims. (Cl. 33—174)

This invention relates generally to programming apparatus, and more particularly to apparatus of this sort which is adapted both to program a series of different operations and to control the quantitative extent to which each of these operations is carried out.

Prior art program controllers have usually taken the form of a slowly rotating drum having thereon a number of separate peripheral tracks which are respectively contacted by electric brushes. Each of these tracks is comprised in part of one or more arcuate conducting segments connected in circuit with the brush for the track such that an electric control signal is generated when the brush contacts a segment. Electric signals produced by brush-segment contacts in different tracks cause the machine controlled by the drum to perform different kinds of operations. The quantitative extent of any one operation called for by a segment is determined by the arcuate length of the segment.

The described prior art program controllers, while useful in some applications, are characterized by inherent disadvantages which make these controllers unsuitable in other instances where automatic programming is desired. For example, the segments in the various tracks of the drum must act as selectors of both the kind of operation to be performed and the quantitative extent to which the operation is carried out. This assignment to a given segment of the two logically separate functions of selection of the kind of operation and selection of extent of operation is, however, incompatible with the desideratum of controlling the extent of the operation to a highly accurate degree.

As another example of a disadvantage of prior art program controllers of the drum type, it is often the case that the nature of the operations carried out by the programmed machine requires that different programs must be set up from time to time for the machine. In other words, in many instances there is a demand for flexible rather than rigid programming. The described drum-type controllers are, however, incapable of being rapidly and conveniently adjusted to set up different programs so as to be well adapted for flexible programming.

It is accordingly an object of the invention to provide programming apparatus wherein the functions of selection of the kind of operation and selection of the extent of operation are dissociated from each other.

Another object of the invention is to provide programming apparatus wherein the extent to which an operation is carried out may be controlled with a high degree of accuracy.

Yet another object of the invention is to provide programming apparatus which is readily adapted to flexible programming.

For a better understanding of how these and other objects are realized according to the invention, reference is made to the following description of representative embodiments thereof, and to the accompanying drawings wherein.

Figure 3:
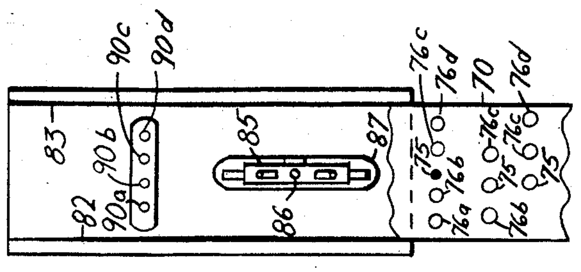
Fig. 3 is a front elevation view (taken as indicated by the arrows 3—3 in Fig. 2) of a portion of the programming unit shown in Fig. 2.

In the description to follow, the same reference numerals will be used for elements which are counterparts of each other, but two or more elements which are counterparts will be distinguished from each other by utilizing different letter, "prime" or other suffixes for the reference numeral which commonly designates all of these elements. It is to be understood, unless the context otherwise requires, that a description of a given element is to be considered as also properly applying to each other element which is designated as a counterpart of the given element.

Figure 1:
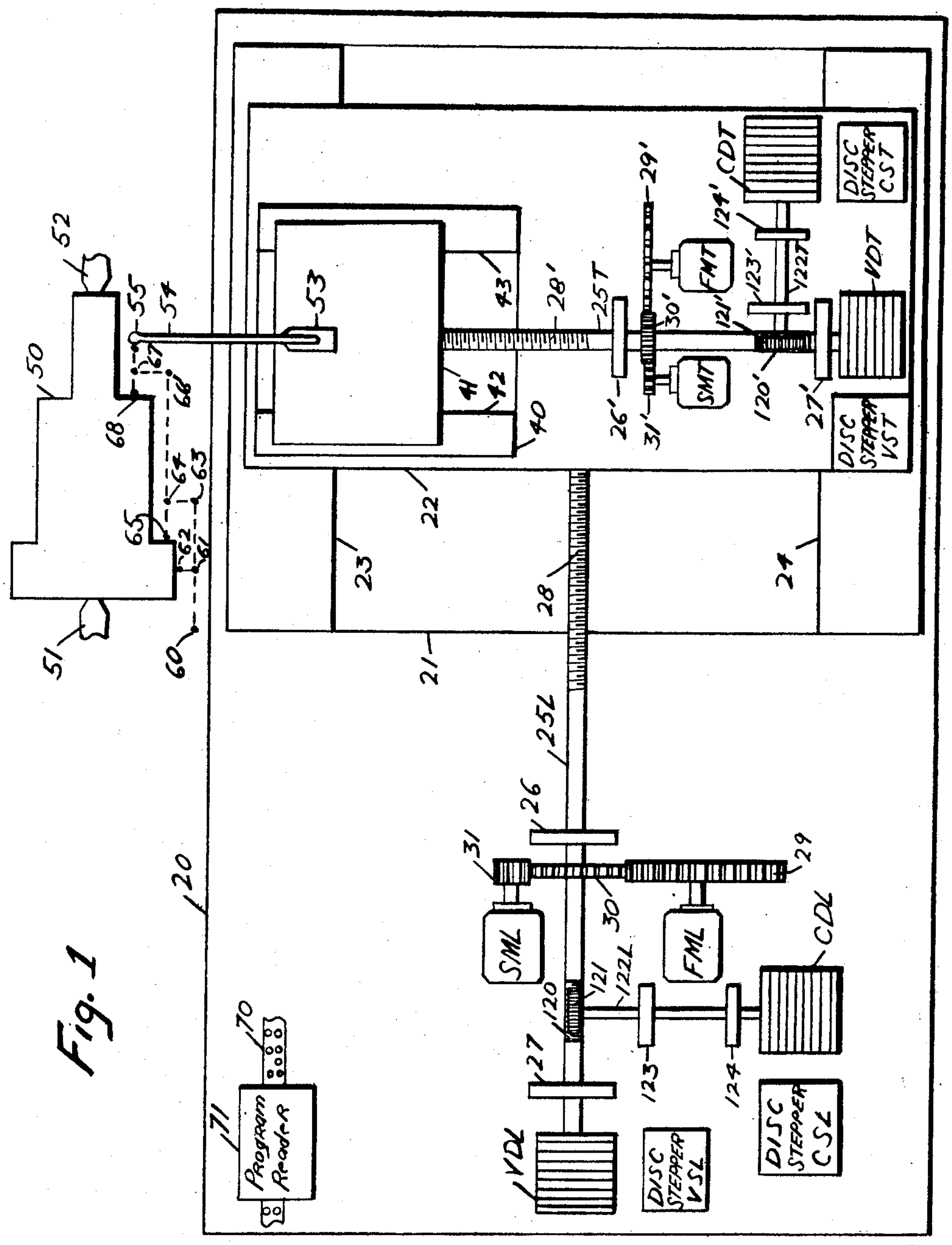
Fig. 1 is a plan view of a gauging machine controlled by programming apparatus representing one embodiment of the invention.

Referring now to Fig. 1, a base 20 mounts a fixed block 21 upon which is mounted a longitudinally movable blocks 22. The blocks 21, 22 form the lower and upper halves of a dovetail slide which is seen from above in Fig. 1 as the margins 23, 24. The block 22 is moved by rotation of a shaft 25L which is journaled in the bearing pedestals 26, 27 upstanding from base 20, and which carries at its right hand end a lead screw 28 passing in threaded engagement through a hole formed in a downward projection (not shown) of block 22. Either rapid or slow longitudinal movement may be imparted to the block 22 by correspondingly rotating shaft 25L rapidly or slowly. If rapid rotation is desired, the said shaft is driven by a three-wire electric reversible motor FML which is coupled to a shaft through a mechanical transmission comprising, for example, a large diameter gear 29 driven by the motor to, in turn, drive an intermediate diameter gear 30 on the shaft 25L. If slow rotation of shaft 25L is desired, the shaft is driven from a three-wire electric reversible motor SML which is coupled to the shaft through a mechanical transmission consisting, for example, of a small diameter gear 31 which is driven by the motor and which, in turn, drives the intermediate diameter gear 30. Since the motors FML and SML are reversible, the block 22 may be given a longitudinal movement either forward (right-hand in Fig. 1) or backward (left-hand in Fig. 1) at either a fast or a slow rate.

The longitudinally movable block 22 acts as a sub-base for a transverse movement assembly. This assembly comprises a lower block 40 mounted on block 22 and an upper block 41 which is mounted over block 40 and is movable with respect thereto. The blocks 40 and 41 form the lower and upper halves of a dovetail slide which is seen from above in Fig. 1 as the edges 42, 43.

Transverse movement is imparted to block 41 by a drive system which includes the elements of a shaft 25T, bearing pedestals 26', 27' which support shaft 25T in journaled relation, a lead screw 28' on the shaft, the three-wire electric, reversible motors SMT, FMT, and the gears 29', 30', 31' which couple the motors SMT, FMT to shaft 25T such that the shaft may be selectively driven at slow speed by motor SMT or at fast speed by motor FMT. The elements just named will not be described in detail inasmuch as these elements are analogous in structure and mutual arrangement to the already-described elements with corresponding reference numerals which form the drive system for imparting longitudinal movement to block 22. As in the case of block 22, the transversely movable block 21 may be given either a forward movement (upward in Fig. 1) or a backward movement (downward in Fig. 1) at either a slow speed or a fast speed by selecting the appropriate one of the motors SMT, FMT to drive shaft 25T, and by appropriately energizing for rotation in a forward or a reverse direction that one of motors SMT, FMT which has been selected as the drive motor.

The machine of Fig. 1 is a machine for gauging mechanical parts such as the part 50 supported by the hardened centers 51, 52. To the end of performing this gauging action, the block 41 carries a probe holder 53 which, in turn, resiliently mounts a probe arm 54 having a contact ball 55 at its free end. The nature of the resilient mounting is such as to maintain the ball 55 in fixed, accurately spaced relation from holder 53 when the ball is not in contact with part 50, but to permit a resilient backward "give" of the probe arm 54 relative to holder 53 when the ball 55 in the course of transverse movement makes contact with part 50. For more details of how probe arm 54 may be resiliently mounted on holder 53, reference is made to U. S. Patent 2,697,879, issued to William S. Tandler, et al. The probe arm 54, is, itself, resilient to permit a "give" in a longitudinal direction of ball 55 relative to holder 53 when the ball contacts a surface of part 50 in the course of longitudinal movement.

The gauging of a tolerance condition of a local surface area of part 50 is performed by moving that one of blocks 22, 41 which will displace ball 55 in the proper direction to make contact with the area to be gauged, and by continuing this movement until ball 55 is brought into contact with the area. The ball 55 and the part 50 are both connected in a "probe circuit" and act, electrically speaking, as opposite contacts of a "switch" which "closes" when ball 55 engages part 50 to produce an electric signal at the instant that the engagement occurs. While this signal gives an indication of the position where the engagement takes place, this positional indication, in order to be a meaningful measure of the dimensional condition of the gauged area, must be translated into an indication of distance from a principal reference position which is used as a standard for all gauged areas, or into an indication of distance from a secondary reference position which is a known distance from the principal reference position and which is used only for one or more particular gauged areas. The term "reference position" will be used hereafter to refer to the principal reference position unless the context otherwise requires.

While the mentioned "reference position" may be considered as a position of ball 55, it is also possible to consider the "reference position" as a pre-determined position of block 22 in the case of a longitudinal movement operation or as a predetermined position of block 41 in the case of a transverse movement operation. This is so since there is only one position for block 22 and only one position for block 41 at which these blocks by their movements can locate ball 55 in its reference position. It is desirable to define "reference position" in terms of these unique positions of blocks 22 and 41 in order to permit separate indications to be made when the reference position is reached in respect to the longitudinal coordinate and when the reference position is reached in respect to the transverse coordinate.

The mentioned distance indication is obtained by utilizing a recording system 56 (Fig. 8) which is subdivided into a longitudinal recording unit 57 and a transverse recording unit 57'. The unit 57 includes an electrosensitive record strip 59, i. e., a strip of Teledeltos paper or the like upon which a mark can be produced by passage of electric current through the strip. The strip is driven under a recording stylus 58 such that the movement between strip and stylus simulates part or all of a movement by which block 22 brings ball 55 into contact with an area to be gauged thereby. When ball 55 contacts the area to produce the mentioned signal, the signal causes the stylus to produce a mark on the paper representing the contact. The stylus is also energized to produce another mark on the strip at the time that block 22 reaches, say, a secondary longitudinal reference position. The amount of spacing on the strip between the mark representing the secondary longitudinal reference position and the mark produced on engagement of ball 55 with part 50 will be a dimensional measure from which may be derived by simple calculation the dimensional departure of the gauged area of part 50 from the pre-established dimensional value therefor, as, say, a maximum tolerance value. A similar system may be used to record the results determined by transverse gauging operations.

For further details of recording systems suitable for use with the Fig. 1 machine, reference is made to U. S. Patent 2,697,879, U. S. Patent 2,697,880 or U. S. Patent 2,699,068.

In Fig. 1, the points 60—68 represent end points of a typical pattern of paths (represented by dotted lines in the figure) traveled by the ball 55 in the course of gauging various local areas of the part 50. It will be evident from the layout of points 60—68 that positional operations which station the ball 55 preliminary to probing are interspersed with positional operations wherein ball 55 probes part 50 to gauge a local area thereof. It will also be evident from this layout that any one positional operation performed in respect to ball 55 can be defined in terms of four "either-or" parameters of movement, namely, movement which is longitudinal or transverse, fast or slow, forward or back, and for the purpose of stationing or probing. Thus, the consecutive positional operations which have advanced the ball 55 from a position at point 60 to its presently-shown position, can be qualitatively analyzed in terms of the mentioned movement parameters as indicated by the table below.

| Change in Position | Transverse or Longitudinal | Fast or Slow | Forward or Back | Station or Probe |
|---|---|---|---|---|
| 60 to 61 | L | F | F | S |
| 61 to 62 | T | S | F | P |
| 62 to 61 | T | S | B | S |
| 61 to 63 | L | F | F | S |
| 63 to 64 | L | F | F | S |
| 64 to 65 | L | S | B | P |
| 65 to 66 | L | F | F | S |
| 66 to 67 | T | F | F | S |
| 67 to 68 | L | S | B | P |
| 68 to present position | L | F | F | S |

A series of operations such as are shown in the above table is carried out consecutively and automatically by the Fig. 1 machine in response to consecutive sets of selection signals generated by a programming unit. This unit may be a punched tape 70 and a reader 71 for the tape as shown in Fig. 1 or may be any other suitable form of programming unit wherein preselected coded indications (which may be either stored in the programmer or transmitted to the programmer) are successively translated into control signals which set up the programmed machine for different operations in accordance with the selections made by the coded indications.

Figure 2:
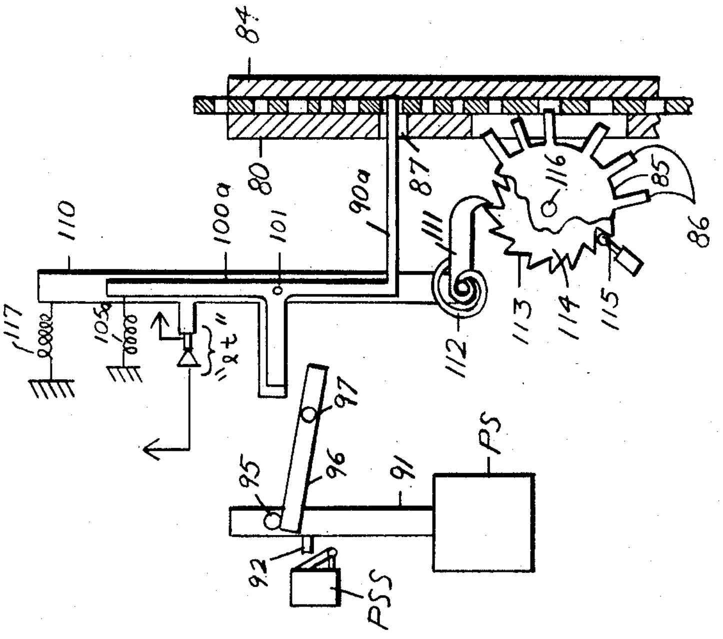
Fig. 2 is a partial, side elevation view in cross-section of the programming unit of the system of Fig. 1.

While the programming unit per se is not part of the present invention, a brief description of the details of a suitable programming unit will be given in order to provide a better understanding of the operation of the Fig. 1 embodiment. Referring to Figs. 2 and 3, the tape 70 is perforated along its center line by successive sprocket holes 75. Each sprocket hole marks the position on the tape of a code group in the nature of a present-absent permutation of four code holes **76*a*—76*d* which, when present occupy relative positions from left to right across the tape as shown in Fig. 3. In any code group, a code hole 76*a*, if present, selects longitudinal movement for the operation represented by the code group, and, conversely, the absence of such hole selects transverse movement for the operation. The presence and absence of a code hole 76*b* selects, respectively, fast movement and slow movement for the operation. The presence and absence of a code hole 76*c* selects, respectively, forward movement and backward movement for the operation. The presence or absence of a code hole 76*d*** selects stationing and probing as, respectively, the type of operation to be performed.

The tape 70 moves through a path defined by a back plate 80, a pair of lateral guides 82, 83 on plate 80, and a cover plate 84 (Fig. 2). The tape 70 is advanced upwards step by step through its path by a sprocket wheel 85 having sprockets 86 which pass through a slot 87 formed in back plate 80 to engage with the sprocket holes 75 of the tape. With each advancement of tape 70 a new code group thereon is brought into registry with an upper slot 88 formed in the back plate, and the presence or absence of each of the holes **76*a*—76*d* in the registering code group is sensed by four corresponding prods 90*a*—90*d* which are movable through slot 88 to advance towards or withdraw from the tape 70**.

The movements of the sprocket wheel 85 and of the prods 90 are synchronized by mechanism shown in Fig. 2. In this mechanism a normally de-energized program stepper solenoid PS is intermittently energized to draw the armature bar 91 downward. When the armature bar so moves, a lug 92 on the armature bar strikes a single-pole, double-throw microswitch PSS to momentarily throw the movable contact of the microswitch such that this movable contact opens a normally closed circuit and closes a normally open circuit. Further details of the operation of microswitch PSS will be given hereafter.

As a second effect, the downward movement of armature bar 91 causes a pin 95 on the bar to strike the rear end of a rocker plate 96 which pivots about a pin 97. The rocking motion imparted to plate 96 causes the front end thereof to strike from underneath the backwardly-projecting horizontal arms of four bell crank levers **100*a*—100*d* which are each rotatable around a pivot pin 101, and which are one behind the other in Fig. 2 so that only the frontmost bell crank lever 100*a* is seen. The bell crank levers 100*a*—100*d* respectively carry the prods 90*a*—90*d*. The rocker plate 96, by striking the bell crank levers, causes each of these levers to undergo a slight reverse rotation about pin 101 so as to withdraw its prod from tape 70. Accordingly, the tape 70 may be freely stepped to bring a new code group into position opposite the slot 87**.

After this new code group has been brought into position, the solenoid PS is de-energized to permit armature bar 95 to move upward to thereby cause disengagement of rocker bar 96 with the bell crank levers. When so disengaged, each of the levers will undergo a slight forward rotation about pin 101 under the urging of a spring **105*a* in the case of lever 100*a* and under the urging of a similar spring in the case of the other levers. Each lever when rotated forwardly moves its associated prod 90** towards the tape. If any prod encounters a code hole in the tape, that prod will pass through the tape to thereby permit its associated bell crank lever to undergo the full forward rotation which is possible for the lever. If, on the other hand, no code hole is formed in the tape at the code position corresponding to a given prod, that prod will stop at the surface of the tape, and the bell crank lever associated with the prod will not move through its full forward rotation.

The bell crank levers which carry the prods **90*a*—90*d*** have four pairs of electrical contacts respectively associated therewith. The first pair of contacts *lt* (longitudinal-transverse) is, as shown in Fig. 2, associated with the bell crank lever **100*a* carrying the prod 90*a***, and these contacts *lt* will be closed and open when, respectively, the bell crank lever **100*a* does or does not rotate fully forward in accordance with whether the prod 90*a* of the lever does or does not encounter a code hole 76*a*** in the tape. An *fs* (fast-slow) set of contacts, an *fb* (forward-back) set of contacts, and an *sp* (station-probe) set of contacts are controlled in like manner as to closed or open position by, respectively, the prods **90*b*—90*d*. The four mentioned pairs of contacts serve, when actuated by prods 90*a*—90*d*, to translate each code group on tape 70** into electric signals which, as later described in detail, set up the Fig. 1 machine to perform the kind of operation indicated by the code group.

Step-by-step advancement of the tape 70 is accomplished in the following manner. When rocker plate 96 is moved to impart reverse rotation to the bell crank levers **100*a*—100*d*, the rocker plate also imparts a reverse rotation to a bell crank lever 110 which, like the levers 100*a*—100*d*, is pivoted about the pin 101. The bell crank lever 110 carries at its lower end a pivoted pawl 111 which is urged by a coil spring 112 into engagement with the ratchets 113 of a ratchet wheel 114. The reverse rotational movement of bell crank lever 110 produces a translational movement of pawl 111 which steps the ratchet wheel 114 over one ratchet to be held thereafter by the detent 115. The step of rotary movement thus imparted to ratchet wheel 114 is communicated to sprocket wheel 85 through a shaft 116 upon which both the ratchet wheel and the sprocket wheel are mounted. The sprocket wheel accordingly advances tape 70 forward a step in the manner heretofore described. When solenoid PS is de-energized, the rocker bar 96 disengages from bell crank lever 110, and the bell crank lever under the urging of a tension spring 117 rotates forwardly to ready the pawl 111 to move the ratchet wheel 114** through another step.

Having described the manner in which there are developed electric control signals which select the kind of operation which the Fig. 1 machine is to perform, it is now necessary to consider the manner in which control is obtained or a measure is obtained over the quantitative extent to which each selected operation is carried out. Referring back to Fig. 1, since the shaft 25L always has the same angular position when the block 22 is at its longitudinal reference position, this position of shaft 25L can be considered as an angular reference position for the shaft which corresponds with the longitudinal reference position for the block. Moreover, when shaft 25L is rotated from its angular reference position to translationally displace block 22 from its longitudinal reference position, the translational displacement of the block will be proportional to the angular displacement of the shaft. In dependence on how far it is necessary to move block 22, the actual displacement of shaft 25L may, in fact, consist of less than one whole revolution, one or more exact whole revolutions, or one or more exact whole revolutions plus a fraction of a whole revolution. Since the reference position of ball 55 in the longitudinal dimension and displacements of the ball in this dimension may, as described, be respectively translated into a reference position and corresponding displacements of block 22 in a longitudinal dimension, and since this reference position and these displacements of block 22 may likewise be translated into an angular reference position and actual angular displacements from this last-named reference position of shaft 25L, it will be seen that the angular reference position of the shaft may be used in gauging measurements as a substitute for the reference position of ball 55, and the angular displacements of shaft 25L used as a measure of the displacement in the longitudinal dimension of ball 55 from its reference position.

Irrespective of the actual amount of angular displacement of shaft 22 from its reference position, there are two different methods of measuring this displacement. The first method, which will be called the approximate, or "coarse" method, is to assign unit value to each whole revolution of the shaft, and to measure the actual angular displacement of the shaft to the nearest whole revolution. This first method is desirable where, as in the usual stationing operation, the ball 55 must be given a relatively large displacement, but where the amount of displacement of the ball as measured by shaft 25L need not be known with any great accuracy. The second method, which will be called the fine, or "Vernier" method, is to subdivide a whole revolution of the shaft into a large number of unit angles, and to measure the actual angular displacement of the shaft in terms of these unit angles. This second method is useful in the instance where, as in probing, it is necessary to know with accuracy a displacement of ball 55 as measured by shaft 25L.

It is to be noted that the two described measuring methods can be used together to good effect in the instance where block 25L must be given a relatively large displacement, but where at the same time the displacement of the block must be determined with considerable accuracy. In such instance, the block is displaced by a two-step procedure wherein during the first step the coarse measure of angular displacement of shaft 25L is employed to indicate when block 22 is approximately at its desired final position, and wherein during the second step the Vernier measure of angular displacement of shaft 25L is employed to determine the amount by which the approximately positioned block 22 must be corrected in position to bring the block exactly to its desired final position.

While the foregoing discussion has dealt with the manner in which either or both of a coarse measure and a Vernier measure of the angular displacement of shaft 25L from an angular reference position can be used to obtain quantitative results representing displacements in the longitudinal dimension of ball 55 from a reference position therefor, it will be realized that the same principles apply to the transverse movement shaft 25T, and that a coarse measure and a Vernier measure of angular displacements of this latter shaft from an angular reference position therefor can likewise be used to obtain quantitative results representing displacements of ball 55 in the transverse dimension from a reference position therefor.

In order to provide a coarse measure of the angular displacement of shaft 25L, a worm 120 on the shaft drives a worm gear 121 such that the worm gear undergoes one full revolution for 80 full revolutions of shaft 25L. The worm gear 121, in turn, drives a shaft 122L which is journaled in the bearing pedestals 123, 124 upstanding from base 20, and which is mechanically coupled at its free end to a coarse longitudinal disc stack CDL having associated therewith a coarse longitudinal disc stepper CSL. The disc stack CDL is, in fact, the unit which obtains the approximate measure of the angular displacements of shaft 25L from its angular reference position.

The Vernier measure of angular displacement of shaft 25L is obtained by a Vernier longitudinal disc stack VDL mechanically coupled with the shaft at the free end thereof. This disc stack VDL has associated therewith a Vernier longitudinal disc stepper VSL.

The approximate measure of angular displacements of transverse movement shaft 25T from its angular reference position is obtained by a coarse transverse disc stack CDT mechanically coupled to shaft 25T through a drive system which includes the elements 120′, 121′, 122T, 123′ and 124′, these elements being counterparts in structure and function with the elements of corresponding reference numerals which form the drive system connecting disc stack CDL with shaft 25L. The Vernier measure of the angular displacements of shaft 25T is obtained by a Vernier transverse disc stack VDT mechanically coupled to shaft 25T at the free end thereof. The disc stacks CDT and VDT have respectively associated therewith the coarse transverse disc stepper CST and the Vernier transverse disc stepper VST.

Figure 6:
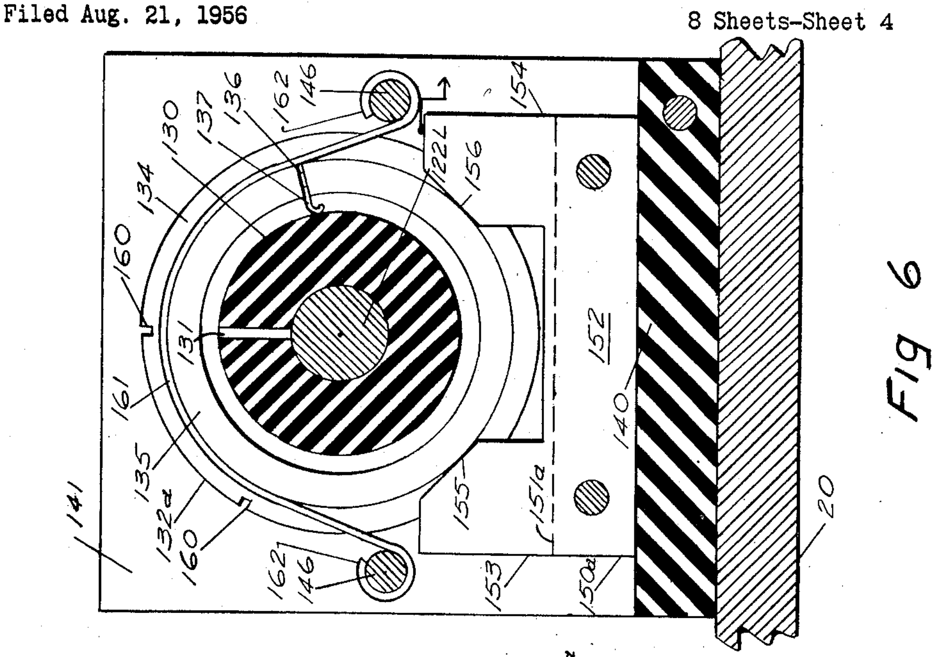
Fig. 6 shows the unit of Fig. 4 in a front elevation view taken in cross-section as indicated by the arrows 6—6 in Fig. 5.

Each of the disc stacks CDL, VDL, CDT and VDT is essentially similar in structure and operation. Accordingly, only the disc stack CDL will be described at length, the details of this last-named disc stack being shown in Figures 4, 5 and 6. Referring to these figures, the shaft 122L mounts at its free end a concentric rotor 130 of insulating material which is radially slotted lengthwise to receive an insert of a thin brass plate 131 (Fig. 6). The plate 131 extends axially the length of the rotor and radially from the surface of the rotor to the shaft 122L to be grounded through the shaft. Encircling the rotor 130 in concentric relation are a plurality of selector discs 132*a*—132*f*. Considering 132*a*, the disc consists (Fig. 6) of an annular insulating ring 134 and of an annular ring 135 which is electrically conducting and which is coaxially secured to the ring 134. The conductor ring 135 has the same inner diameter as the insulating ring 134 but a smaller outer diameter than the insulating ring. The ring 135 has a slot 136 formed therein, and this slot holds an electric contact whisker 137 which projects radially inward to slide over the surface of rotor 130. Each of the other selector discs 123*b*—132*f* is of the same construction as disc 132*a*.

Figure 4:
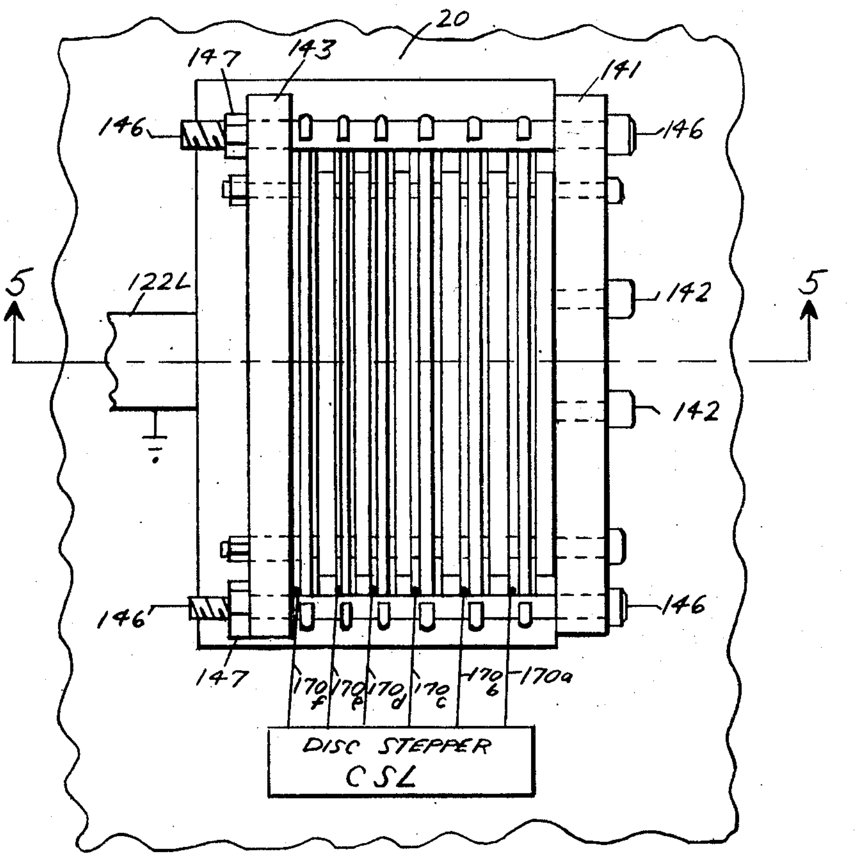
Fig. 4 is a detailed plan view of one of the quantity selector units of the system of Fig. 1.
Figure 5:
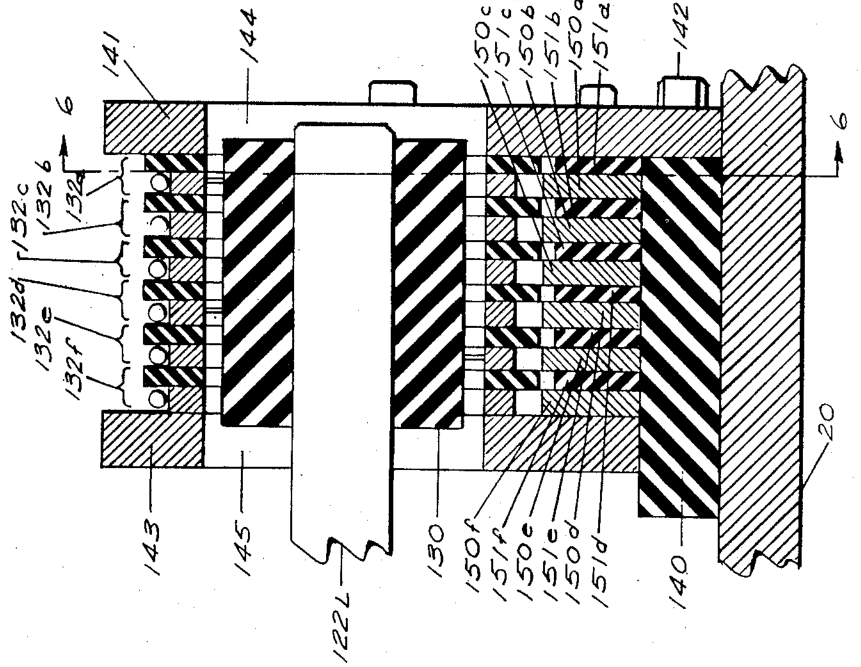
Fig. 5 illustrates the selector unit of Fig. 4 in a side elevation view taken as indicated by the arrows 5—5 in Fig. 4.

The axial support for discs 132*a*—132*f* comprises an insulating plate 140 mounted on base 20, a vertical end plate 141 fastened to one end of plate 140 by bolts 142, and another vertical end plate 143 which is horizontally slidable in respect to plate 140. The end plates 141, 143 have respective circular apertures 144, 145 formed therein such that these apertures have the same diameter as the inner diameter of the discs 132*a*—132*f*. The two end plates may be drawn together by a pair of bolts 146 which extend axially through plate 141, past the discs 132*a*—132*f* on opposite sides thereof, and through the plate 143 to be received into the nuts 147 (Fig. 4). By adjusting nuts 147 on the bolts 146, the several discs which constitute the disc stack may be clamped together with any tightness desired.

The discs 132*a*—132*f* are radially supported by, respectively, a plurality of electrically conducting shoes 150*a*—150*f* which rest on the insulating plate 140, and which are axially separated by a plurality of insulating spacers 151*a*—151*f*. As best shown in Fig. 6, the shoe 150*a* which supports disc 132*a* is formed of a horizontal section 152 and two vertical sections 153, 154 which extend upwardly from the ends of horizontal section 152 such that the shoe 150*a* is of bracket form. The section 153 is characterized by an edge 155 which slants from the top of the section downwardly to the inner side thereof, and the section 154 is characterized by a similar edge 156. The edges 155, 156 support the disc 132*a* by providing a V seat upon which rests the annular ring 135 of the disc. The edges 155, 156 also provide an electrical contact with annular ring 135 whereby an electric current path is established through shoe 150*a* and annular ring 135 to the whisker 137. Each of the other discs 132*b*—132*f* is supported from its corresponding shoe and electrically coupled with its corresponding shoe in a similar manner.

It is intended that the disc 132*a* be rotatably adjustable by, say, inserting a pick or other pointed adjusting tool into one of several notches 160 formed in the periphery of insulating ring 134, and by exerting force through the tool to rotate the disc. At the same time, the disc 132*a* must be seated firmly enough on shoe 150*a* to prevent inadvertent rotation of the disc. These two requirements are met by using a wire bail 161 which is anchored at its opposite ends to the two bolts 146 by hook portions 162 formed in the bail to partially encircle the bolt, and which between its two ends passes over and around the annular ring 135 in contact with the upper arcuate peripheral surface of this ring. The bail 161 exerts on ring 135 an amount of force which seats the ring firmly on the edges 155, 156, and which, at the same time, permits adjustment in rotation of disc 132*a* by the application of moderate force through an adjusting tool to the notches 160*a* of insulating ring 134.

The discs 132*a*—132*f* are selected seriatim to provide coarse quantitative position control or a coarse quantitative positional indication for, respectively, a plurality of coarse measure, longitudinal movement operations which are consecutive in relation to each other but which may be separated in time succession by other kinds of positioning operations. To provide for successive disc selection, the shoes 150*a*—150*f* are, as shown in Fig. 4, connected to the coarse longitudinal disc stepper CSL by respective leads 170*a*—170*f*. As described later in detail, the disc stepper CST electrically switches, in turn, each of the discs 132*a*—132*f* into interconnected relation with the Fig. 1 machine so that each disc controls one coarse measure, longitudinal movement operation as these operations successively appear in the program set up for the machine.

Considering now how the discs 132*a*—132*f* are used in operation, assume that when the shaft 25L (Fig. 1) is in its mentioned angular reference position, the brass plate 131 of rotor 130 is, as shown in Fig. 6, at the top of the rotor and exactly vertical. This position for the plate 131 will be considered the "zero angle" therefor. As the shaft 25L rotates away from its reference position, the plate 131 will also rotate away from its "zero angle," but the angular movement of plate 131 will only be $\frac{1}{80}$ of that of shaft 25L since the worm 120′ and worm gear 121′ (Fig. 1) provide an 80:1 angular step-down ratio between the shaft 25L and the shaft 122L which rotates the plate 131. It follows that eighty full revolutions of shaft 25L will be represented by one full revolution of plate 131 from its "zero angle" back to its "zero angle."

Assume now that the longitudinal movement operation being effected by the rotation of shaft 25L requires only a coarse measure of the quantitative amount by which shaft 25L must angularly move from its reference position in order to carry out the operation, and assume further that the disc 132*a* has been selected as the disc which will provide the coarse measure of position for this particular operation. As a preliminary which is undertaken some time before the Fig. 1 machine is automatically operated under the control of the programming unit, the disc 132*a* will in the course of adjustment have been rotated to angularly displace the whisker 137 from the zero angle of plate 131 in an amount representing to an approximation the amount of angular movement of shaft 25L from reference position which is necessary to carry out the operation. When the operation is actually taking place, the motion of shaft 25L which is transmitted through shaft 122L to rotor 130 and plate 131 will cause the plate to approach closer and closer to whisker 137 until the plate makes electrical contact with the whisker. The making of this contact produces (in a manner later described) an electric signal which causes the motion of shaft 25L to terminate. Under these conditions, the ball 55 will, for the particular operation, have been longitudinally displaced in an amount determined by the setting of the disc 132*a*.

The other discs 132*b*—132*f* serve to control respective, coarse measure, transverse movement operations in the same manner as that just described for disc 132*a*. Each disc is adjusted prior to actual operation of the Fig. 1 machine such that the whisker of the disc is set to the angle which represents the amount of movement desired to be controlled by the disc. This adjustment may be carried out by loosening the end plates 141, 143 to permit relatively easy rotation of the discs by an adjusting tool, and by tightening plates 141, 143 to clamp the discs in place after all of the discs have been set. Thereafter, when the Fig. 1 machine is being automatically operated under the control of the programming unit, the discs 132*a*—132*f* are electrically connected one by one with the Fig. 1 machine to quantitatively control, in turn, the consecutive longitudinal movement operations which are set up on the machine by the programming unit.

In connection with the operation of discs 132*a*—132*f*, it is to be noted that the shaft 25L when controlled by these discs does not necessarily move an exact number of whole revolutions from its reference position, nor is it usually attempted to set the disc so as to produce a movement of this exactitude. All that these discs need do is to control the movement of shaft 25L to the nearest whole revolution, and the discs can be readily set to produce a movement of this accuracy.

It is also to be noted that the shaft 25L need not be returned to its angular reference position between operations controlled by successive ones of the discs 132*a*–132*f*. This is so, since the whiskers of the discs are set to represent angular displacements of the shaft 25L from its reference position. Hence, in any particular coarse measure, longitudinal movement operation, the whisker of the disc used to control the operation will terminate movement of the shaft at the position corresponding to the proper angular displacement from reference position irrespective of whether or not the shaft at the start of the operation was at reference position.

The coarse measure, transverse disc stack CDT controls transverse positioning operations in the same manner as longitudinal positioning operations are controlled by the disc stack CDL. The vernier measure, transverse movement disc stack VDT and the vernier measure, longitudinal disc stack VDL also control positioning operations like the disc stack CDL except for the following distinctions. First, in the vernier measure disc VDL, for example, the contact plate of the insulating rotor makes one whole revolution for each revolution of the shaft 25L. It follows that the individual discs of stack VDL can be adjusted so that the whiskers thereof, in accordance with their angular displacements from "zero angle," will provide an accurate measure of the angular movement of shaft 25L through a fraction of only one revolution. An angular movement of the shaft of only this amount corresponds to a very small longitudinal displacement of the carriage 41 and of the ball 55. As a second distinction, while the disc stack VDL may be used like the disc stack CDL to control stationing operations, the disc stack VDL may also be used in probing operations whereby indications are obtained of the departures of gauged local areas of part 50 from, say, maximum tolerance values which have been assigned to these areas.

In these probing operations, the vernier discs are not used to produce a control signal which operates to terminate the movement of carriage 41 (for a transverse movement operation) or of carriage 22 (for a longitudinal movement operation) when the moving carriage has reached a predetermined position. Instead, other means are used to terminate the carriage movement and the vernier discs are used to produce a signal indicating when ball 55 is in a position corresponding to a secondary reference position for the area of part 50 which is being gauged. This indicating signal is, however, produced by each of the vernier discs in the same manner as the control signal is produced by the coarse discs. In other words, each vernier disc is set to angularly displace the whisker thereof from "zero angle" in the proper amount so that the rotor contact plate will develop an electric signal by contact with the whisker when ball 55 is in the secondary reference position selected for the probing operation in which the disc is being used.

The indicating signals produced by the vernier discs of stack VDL, for example, are supplied, as described, to the recording stylus 58 (Fig. 8) to make marks on record strip 59 representing the secondary reference positions for the local areas of part 50 which are gauged in the course of the several probing operations in which the discs of stack VDL take a part. These "secondary reference position" marks may be then compared, as described, with the marks produced on the record strip by contact of ball 55 with the gauged local areas to determine the departure of these areas from preselected dimensional values.

It will thus be seen that the several vernier discs in a stack thereof may serve to define a plurality of positions representing respective tolerance values for a plurality of local areas of a mechanical part of irregular shape. Since each vernier disc may be individually adjusted, a single stack of vernier discs may be utilized at various times to indicate a tolerance value "outline" for a number of mechanical parts which are widely different in shape.

Figure 7:
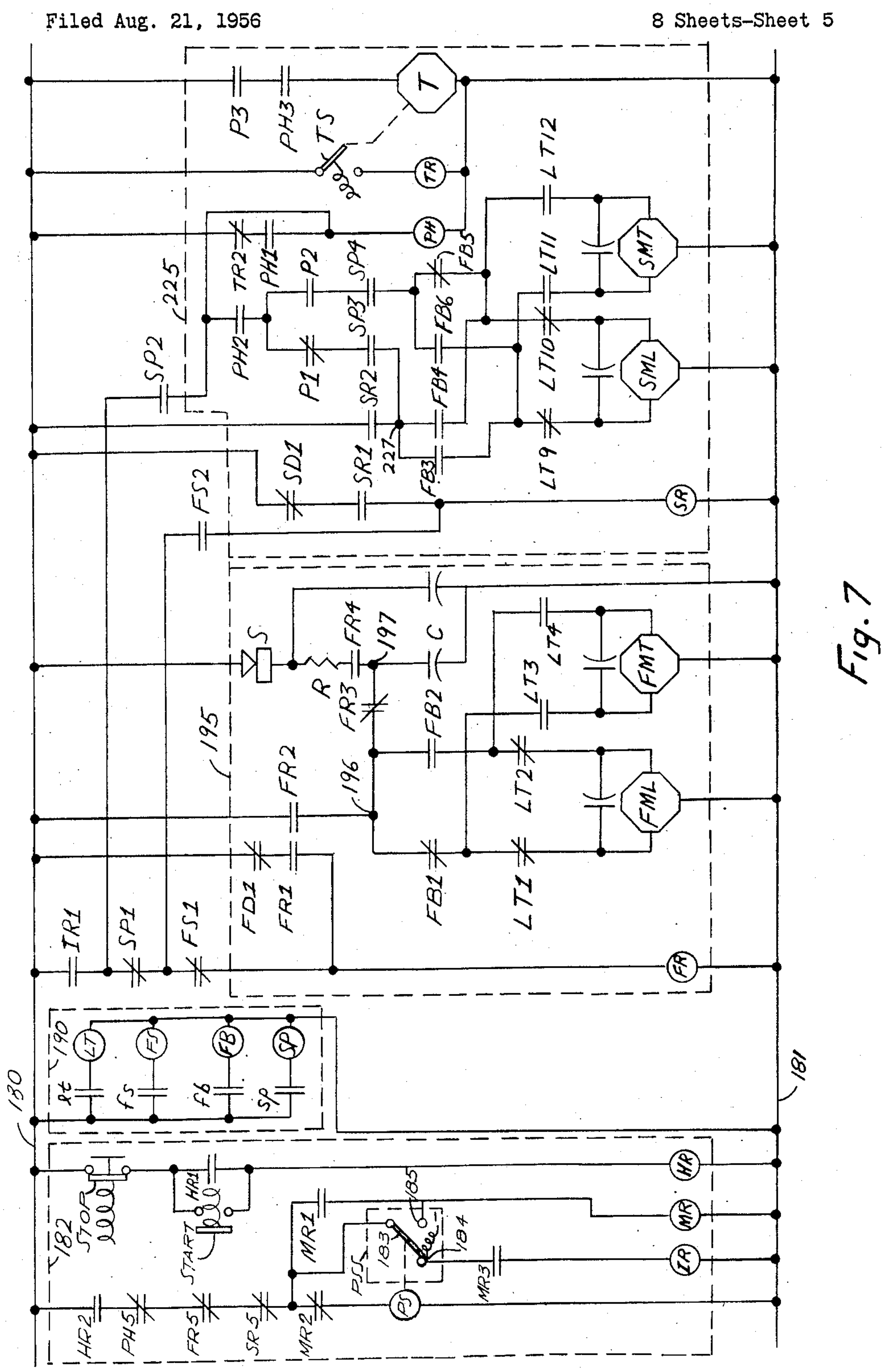
Figs. 7 and 8 are schematic diagrams of various electrical circuits utilized in conjunction with the Fig. 1 system.
Figure 8:
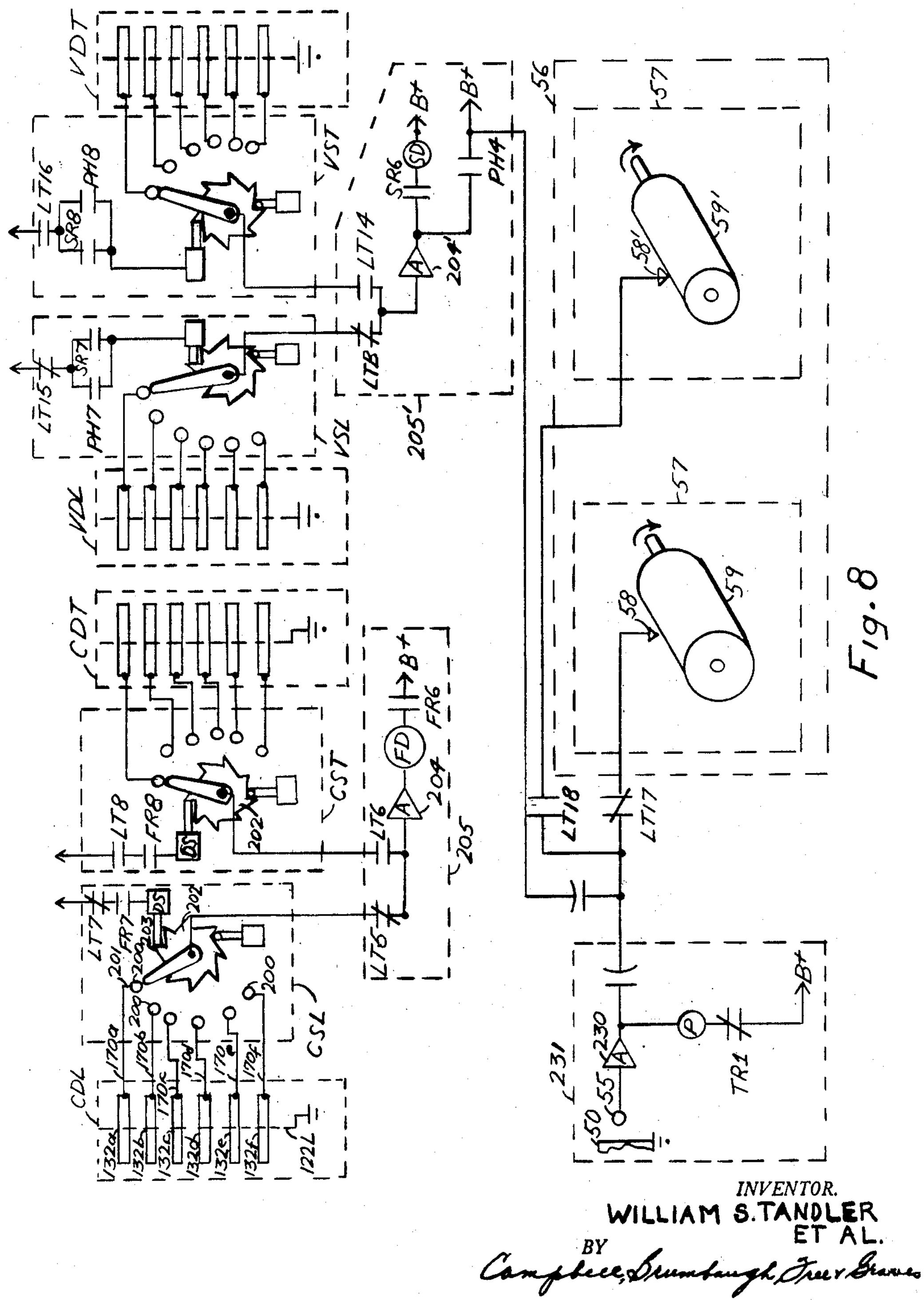

The several disc stacks CDT, VDT, CDL, VDL are electrically interconnected with the Fig. 1 machine through electric circuits which are shown in Figs. 7 and 8. In these figures it will be understood that pairs of contacts are shown as opened and as closed (by, respectively, the absence and presence of a diagonal line through the contacts) for the condition where the relay winding which actuates the contact is unenergized. It will be further understood that any switch actuating springs shown in the figures are to be considered as compression springs.

In Fig. 7 the numbers 180, 181 designate a pair of A. C. lines which supply power to the various circuits shown therein. Automatic programming of the Fig. 1 machine is initiated by depressing the "start" switch in the program stepping circuit 182 to thereby energize relay winding HR in this circuit. This winding, when energized, has the effects of closing contact HR1 to establish a self-holding circuit for itself, and of closing contact HR2 to energize the tape stepping and reading solenoid PS already discussed in connection with Fig. 2. Solenoid PS when energized causes actuation of the microswitch PSS such that movable contact 183 of the microswitch swings from a normally closed position with fixed contact 184 to a closed position with fixed contact 185. The closure of contacts 183, 185 energizes a relay winding MR.

Winding MR, when energized, closes contacts MR1 to establish a self-holding path for itself. As a second effect, winding MR when energized opens the normally closed contacts MR2 to thereby de-energize solenoid PS. As a third effect, the energization of winding MR closes a pair of contacts MR3 connected in circuit with fixed contact 184 of microswitch PSS. When solenoid PS becomes de-energized as described, the movable contact 183 swings back from closure with fixed contact 185 to closure with fixed contact 184 to thereby energize an initiating relay winding IR through the now closed contact MR3. The winding IR energizes a winding IR1 which permits power to be applied to the motor circuits.

Meanwhile, the energization of solenoid PS will have caused tape 70 to be stepped to thereby bring a new code group into reading position so that the selections indicated by the code holes of this new code group may be read out by the prods 90*a*—90*d* (Fig. 3). The prods 90*a*—90*d* sense the new code group presented to the prods by tape 70 such that none, one or ones of the contacts "*lt*," "*fs*," "*fb*" and "*sp*" become closed. As shown in Fig. 7, these last-named contacts are respectively connected in a relay read-out circuit 190 with a plurality of relay windings LT, FS, FB and SP which serve to set up the Fig. 1 machine for the positioning operation indicated by the code group. Thus, winding LT when left unenergized selects longitudinal movement, but if energized selects transverse movement; winding FS when left unenergized selects fast movement, but if energized selects slow movement; winding FB when left unenergized selects forward movement but if energized selects backward movement; and winding SP when left unenergized selects a stationing operation but if energized selects a probing operation. All of these seelctions will have been made prior to the closure of the relay contacts IR1.

Assume now that the positioning operation selected by the code group is a stationing operation characterized by longitudinal, fast and forward movement, this type of operation being indicated by the fact that none of the windings LT, FS, FB and SP become energized. When relay contacts IR1 close, these contacts serve to energize the winding FR of a fast relay in the fast circuit 195. The energization of winding FR causes events to occur as follows. First, the contacts FR1 close to establish a holding circuit for winding FR. Second, the contacts FR2 close to permit power to be supplied from junction 196 to the fast longitudinal motor FML or to the fast transverse motor FMT in dependence on which of these motors has been selected for the particular positioning operation. Third, a pair of contacts FR3 open to disconnect a junction 197 from the junction 196. Fourth, the contacts FR4 close to connect a rectifier S, a resistor R, and a capacitor C in series between the lines 180, 181. As a result of this last-named connection, D. C. charge will build up across capacitor C, and this charge is used for dynamic braking of the fast motors, as later described. Fifth, a pair of contacts FR5 in the program stepping circuit 182 open to interrupt power to winding MR. When MR becomes de-energized, the contacts MR3 open to de-energize winding IR to open contacts IR1. Nothing more happens in circuit 182 until the end of the positioning operation.

As stated, the closure of contacts FR2 causes power to be supplied to one of the fast motors FML or FMT. In the present instance, it has been assumed that the positioning operation which has been selected is charaterized by forward longitudinal movement. Accordingly, power will be supplied from junction 196 through a pair of contacts FB1 (which are closed when winding FB is de-energized as assumed), and through contacts LT1 (which are closed when winding LT is de-energized as assumed) to the fast longitudinal motor FML to cause this motor to rotate in a forward direction. If backward rather than forward movement had been selected, the winding FB would have become energized in accordance with this selection to open the contacts FB1 but to close a pair of contacts FB2, and in this event the motor FML would have become energized through contacts FB2 and a pair of contacts LT2 (which are closed since winding LT is assumed de-energized) such that motor FML would have rotated in a backward direction. If the movement selected had been transverse rather than longitudinal, the winding LT would have become energized in accordance with this selection to open the contacts LT1, LT2 but to close two pairs of contacts LT3, LT4, which lead to opposite sides of the fast transverse motor FMT, and in this event the motor FMT would be supplied with power from junction 196 to rotate forwards or backwards in dependence on which of the contacts FB1, FB2 is closed at the time. Thus, the arrangement of relays in the fast circuit 195 permits selection of fast movement which is either longitudinal or transverse and which is either forward or backward.

Returning to the original assumption of forward, fast, longitudinal movement, the fast longitudinal motor FML continues to rotate in a forward direction until this rotation is interrupted by the opening of a pair of contacts FD1 in series with the contacts FR1 which provides a holding circuit for the winding FR. It is necessary, however, before considering the effect of the opening of contacts FD1 to have an understanding of the events leading up to the opening of these last-named contacts, and for this understanding the reader is referred to Fig. 8.

Fig. 8 inter alia, illustrates diagrammatically the various circuits associated with the disc stacks CDT, CDL, VDT and VDL. Referring particularly to the disc stack CDL, Fig. 8 like Fig. 4 shows the discs **132*a*—132*f* connected to the coarse transverse stepper CSL by the leads 170*a*—170*f*. Within the stepper CSL the leads 170*a*—170*f* respectively terminate at a plurality of terminals 200 which are selectively contacted one by one by a movable contact 201. The movable contact 201 is stepped from one to another of the terminals 200 by a ratchet wheel 202. The wheel 202 is advanced one ratchet at a time by a kicker arm 203 which extends fully from a solenoid DS when the solenoid is de-energized, but which is magnetically withdrawn into the solenoid upon energization thereof such that the kicker arm is prepared to move the wheel 202 another ratchet when the solenoid DS is again de-energized. The movable contact 201 is connected to an amplifier 204 in a fast movement amplifier circuit 205** by a pair of contacts LT6 which are closed when the winding LT (Fig. 7) is de-energized as assumed for the considered stationing operation.

In a similar manner to that just described, the discs of the disc stack CDT are adapted to be selectively connected one by one to the input of amplifier 204 through a pair of contacts LT8 which are closed when winding LT is energized. Thus, the disc stack CDL and the disc stack CDT share in common the amplifier circuit 205. In like manner, the disc stacks VDT and VDL share in common the amplifier circuit 205'.

According to the original assumption that the positional operation considered is one of fast, forward, longitudinal movement, it is the disc stack CDL which will be the stack selected to control the positioning operation. Selection of the disc stack CDL is accomplished by virtue of the following effects. First, the energization of winding FR (Fig. 7) closes a pair of contacts FR6 to permit power to be supplied from a source of B+ voltage to the amplifier 204. Second, the winding FR when energized closes a pair of contacts FR7 such that the kicker arm solenoid DS in the disc stepper CSL is energized to withdraw the kicker arm 203 as the preliminary to moving by one ratchet the ratchet wheel 202 of stepper CSL at the end of the positioning operation. The selection of the longitudinal disc stack CDL in preference to the transverse disc stack CDT is a consequence of the fact that winding LT (Fig. 7) is unenergized for the positioning assumed as selected. With winding LT so de-energized, the contacts LT5 will be closed to connect stack CDL to amplifier 204, but the contacts LT6 will be open to isolate the stack CDT from this amplifier. Also the contacts LT7 will stay closed to permit solenoid DS to be energized through contacts FR7, while the contacts LT8 stay open to prevent the kicker arm solenoid of stack CST from being energized through the now closed contacts FR8.

Assume now that the selected positioning operation of fast, longitudinal, forward movement is taking place as a result of the rotation of motor FML (Fig. 7). This rotation will continue until the disc of stack CDL (Fig. 8) which is connected to amplifier 204 becomes grounded as a result of contact being made between the whisker of the disc and the contact plate inserted in the rotor which is turning inside the disc stack CDL. When the mentioned disc is grounded in this manner, a pulse of current passes through amplifier 204, and this current pulse momentarily energizes the D. C. relay winding FD.

Relay winding FD, when energized, causes the normally closed contacts FD1 (Fig. 7) to open as described to thereby open the holding circuit for winding FR. When winding FR becomes de-energized by the interruption of its holding circuit, the following effects occur. First, contact FR1 opens so as to break the holding circuit for winding FR. Second, the contacts FR2 open to disconnect the motor FML from its source of A. C. power. Third, the contacts FR3 close to permit D. C. current from the charged-up capacitor C to pass through motor FML to thereby dynamically brake the motor. Fourth, the contacts FR4 open to prevent current from passing through rectifier S to the motor FML while this motor is being dynamically braked. Fifth, the contacts FR5 again close to re-establish a current path through the tape stepping solenoid PS of the program stepping relay circuit 182.

When the solenoid PS is re-energized in this manner, a new cycle of operations is begun to advance tape 70 (Fig. 3) another step to bring another new code group into reading position. This cycle of operations takes place in exactly the same manner as before, and the automatic programming of the Fig. 1 machine continues until the programming is brought to a halt by actuating the "stop" switch in the program stepping circuit 182.

The discussion so far has dealt with the operation of the fast circuit 195. This fast circuit is used exclusively for stationary operations. If slow positioning operations are called for, a slow circuit 225 is used. This circuit may be used either when the slow operation is a stationing operation or when the slow operation is a probing operation.

Assume now that a slow stationing operation is to be carried out. The slow circuit 225 is selected in preference to the fast circuit 195 by the action of the winding FS which for a slow operation will be energized. When energized, the winding FS will open a pair of contacts FS1 to disconnect the fast circuit 195 from power, and will close a pair of contacts FS2 to connect the slow circuit 225 to power for stationary purposes. An inspection of Figs. 7 and 8 will indicate that the elements SR, SR1, SR2, SR5 to SR8, FB3, FB4, LT9 to LT16, SD and SD1 are respectively analogous in nature and in interconnection with the already-described elements FR, FR1, FR2, FR5 to FR8, FB1, FB2, LT1 to LT8, FD and FD1. Accordingly, when slow operations are used for stationing, these operations are carried out by the slow longitudinal motor SML or by the slow transverse motor SMT in much the same manner as the motor FML or the motor FMT carries out a fast movement operation.

When the slow circuit 225 is used in connection with probing operations whereby the part 50 (Fig. 1) is gauged, the events which occur in the slow circuit 225 and elsewhere are somewhat different than those which occur during a stationing operation. Accordingly, it is necessary to consider how, electrically speaking a probing operation is carried out.

If the operation under consideration is a probing operation, this fact will be indicated by energization of the winding SP. Winding SP, when energized, opens a pair of contacts SP1 so that the fast circuit 195 cannot be connected to power at all, and so that the slow circuit 225 cannot be connected to power through the contacts FS2, but can be supplied with power through a pair of contacts SP2 which are closed by the energization of winding SP. After contacts SP2 have become closed, the contacts IR1 close as a result of the relay operations taking place in program stepping circuit 182. When contacts IR1 close, circuit passes through contacts SP2 to cause energization of a winding PH.

The winding PH, when energized, produces the following effects. First, a pair of contacts PH1 are closed to establish a self-holding circuit for winding PH. Second, a pair of contacts PH2 close to permit power to be supplied from a junction 226 to the motor SML or the motor SMT in dependence on which of these motors has been selected to carry out the probing operation. Third, a pair of contacts PH3 close as a preliminary to energization of timer motor T. Fourth, a pair of contacts PH4 in the slow movement amplifier circuit 205' (Fig. 8) close to connect the amplifier 204' in this circuit such that the amplifier will operate the recording stylus 58 or the recording stylus 58' rather than the relay winding SD. Fifth, a pair of contacts PH5 (in the program stepping circuit 182) are caused to open to thereby produce an opening up of the contacts IR1 by a series of operations in the circuit 182 which have already been described. Moreover, the energization of winding PH causes closure of the contacts PH7 and PH8 which are connected (Fig. 8) in parallel with, respectively, the contacts SR7, SR8 in order to assure that the ratchet wheel in that one of the disc steppers VSL, VST which is used for the probing operation will be advanced one step after the probing operation has been completed. This advancement of the ratchet wheel after a probing operation takes place in the same way as after a stationing operation.

As stated, the closure of contacts PH2 permits power to be supplied to the motor SML or the motor SMT from the junction 226. This power initially flows to a junction 227 through a pair of contacts SP3 which are closed during a probing operation by virtue of the energization for such operation of the winding SP. From junction 227 the power is selectively switched to the motor SML or the motor SMT in exactly the same manner as the power is switched to one of these motors for a stationing operation.

Assume for the considered probing operation that power is being supplied to the slow, longitudinal motor SML to cause this motor to rotate in the forward direction. This rotation will continue until the carriage 22 is displaced sufficiently to bring the ball 55 (Fig. 1) into contact with the part 50. When this event occurs, an electric signal indicating the contact will, as described in U. S. Patent 2,697,879, be produced and supplied to an amplifier 230 (Fig. 8) in a probe circuit 231 to cause a current pulse to appear at the output of the amplifier. When the probing movement is longitudinal, this current pulse is supplied to the recording stylus 58 through the contacts LT17 (which will be closed and open for, respectively, longitudinal and transverse movement) to cause this stylus to produce on the record strip 59 a mark indicating the occurrence of contact between ball 55 and part 50. When the probing movement is transverse, the output current pulse from amplifier 230 will be supplied to the recording stylus 58' through a pair of contacts LT18 (which will be open and closed for, respectively, longitudinal and transverse movement) to cause the stylus 58' to produce on the record strip 59' a mark indicating the occurrence of the mentioned contact. The current pulse also causes energization of a relay winding P in the probe circuit 231.

The energization of winding P produces the following effects. First, a pair of contacts P1 (Fig. 7) open to interrupt the flow of power from junction 227 to the motor SML which is the motor assumed as being energized for the probing operation under consideration. Second, a pair of contacts P2 close to establish an alternate route for power to the energized motor, this alternate route being from the junction 226 through the closed contacts P2 and through a pair of contacts SP4 which will be closed by virtue of the fact that winding SP is energized during a probing operation. The power which passes through the alternate route will be supplied to the side of motor SML which is opposite to the side from which the motor previously received power. In other words, if the motor SML originally received power through its left-hand side through the contacts FB3 such that the motor originally had a forward rotation, the motor when powered by the alternate route will receive power at its right-hand side through the contacts FB5 such that the motor will be caused to rotate in the backward direction. Conversely, if motor SML originally received power at its right-hand side through the contacts FB4, the motor when powered through the alternate route will receive power at its left-hand side through the closed contacts FB6 such that the original backward rotation of the motor is changed to a forward rotation. It follows that the actuation of the contacts P1 and P2 reverses the rotation of the motor SML from its original direction of rotation, whether forward or backward, to thereby cause the ball 55 to be "backed off" from the part 50.

The energization of relay winding P (Fig. 8) produces as a third effect the closure of a pair of contacts P3 which by their closure complete a power circuit through the already closed contacts PH3 to the timer motor T. Responsive to completion of its power circuit, the timer motor runs for a predetermined time interval during which the ball 55 continues to be backed off from the part 50. At the end of this interval, the timer motor closes a switch TS to thereby cause energization of a relay winding TR. The energization of this winding produces the following effect. First, a pair of contacts TR1 (Fig. 8) open to de-energize the relay winding P. Second, a pair of contacts TR2 (Fig. 7) open to de-energize the relay winding PH. The de-energization of windings P and PH restores the slow circuit 225 to the condition which it originally had before the considered probing operation began. Moreover, the de-energization of winding PH causes the contacts PH5 (in the program stepping circuit 182) to close to thereby initiate in the program stepping circuit a new cycle of operations which will bring a new code group on tape 70 (Fig. 3) into reading position.

In the course of the probing operation, the disc stack VDL (Fig. 8) will operate in the same manner as that previously described for the disc stack CDL during a stationing operation. Thus, a selected disc of stack VDL will cause an output signal to be produced from the amplifier 204' at the time that the ball 55 has reached its secondary reference position for the particular probing operation being considered. This output signal from amplifier 204' will be supplied through the closed contacts PH4 and the closed contacts LT17 to the recording stylus 58 to cause this stylus to produce on the record strip 59 a mark indicative of the secondary reference position for the probing operation. The displacement on the record strip between the mark indicative of the secondary reference position and the mark indicative of actual contact between ball 55 and part 50 will provide a measure of the departure of the contacted area of part 50 from a preselected tolerance value for the contacted area. For example, the mentioned secondary reference position may be a position for the ball which is displaced an exactly known predetermined distance (in the direction away from part 50) from the position the gauged area of part 50 would occupy if this area in dimensional value exactly corresponded to a maximum tolerance value which had previously been established for the area. By subtracting from the displacement actually appearing between the two marks on the record strip the fraction of this displacement which represents the mentioned known predetermined distance, there will be left as a remainder a displacement representing the actual dimensional departure of the gauged area from its maximum tolerance value. In this manner, it is possible by the Vernier discs to define longitudinal and transverse "outlines" to which the part 50 may be compared in respect to maximum or some other tolerance or tolerances which have been specified for the part.

If desired, a single disc may be substituted for the plurality of discs in the disc stack CDL, the single disc being so operated that it provides the same successive position indications as do the discs of stack CDL. In like manner, a single disc may be substituted for each of the disc stacks CDT, VDL and VDT. The substitution of respective single discs for the four mentioned disc stacks is accomplished by modifying the already-described system in a manner which will now be described.

Figure 9:
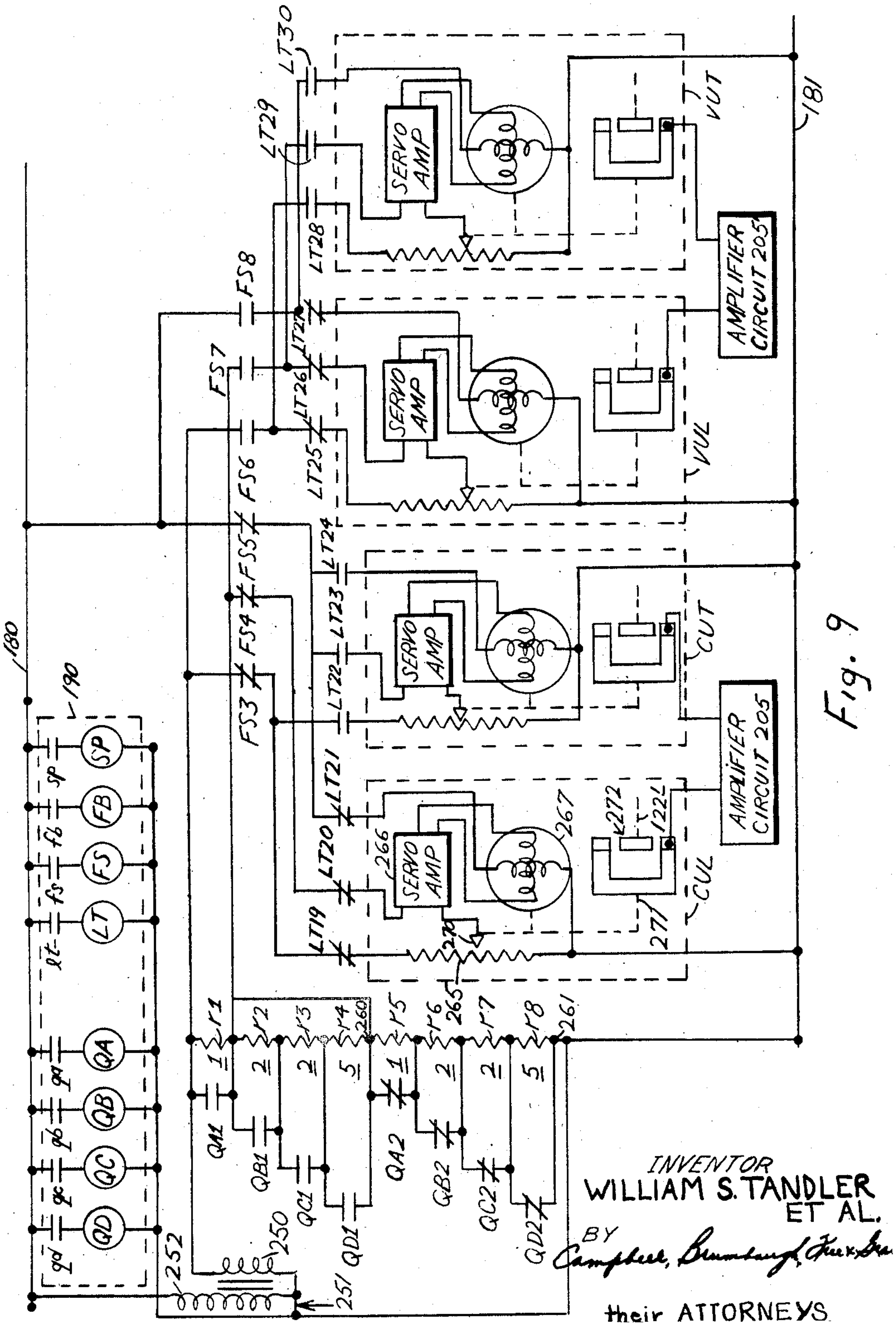
Fig. 9 is a schematic diagram, first, of a quantity selector unit which may be used in place of the Fig. 4 unit, and, second, of additional electric circuits utilized to operate the selector unit shown in Fig. 9 and like units.

Referring to Fig. 9, this figure shows the relay read-out circuit 190 of Fig. 8 in a form which is modified to the extent that the read-out circuit includes not only the contacts *lt, fs, fb, sp* and their associated relay windings LT, FS, FB and SP, but in addition includes an additional set of four contacts *qa, qb, qc, qd* and their respectively associated relay windings QA, QB, QC, QD. The contacts *qa—qd* are, like the contacts *lt—sp,* associated with respective code holes occupying separate positions in the code groups on the tape 70 (Fig. 3). When the Fig. 9 arrangement is used, each code group on tape 70 will represent a presence-absence permutation of eight code holes of which the first four code holes *76a—76d* will, as before, select the already-described "either-or" parameters of movement for the positioning operation which is controlled by the code group. The remaining four code holes correspond to the contacts *qa—qd,* and these four code holes, in dependence on their presence or absence, cause the contacts *qa—qd* to individually assume an open or a closed position (in like manner to that already described for contacts *lt—sp*) to thereby produce electric signals representing the quantitative value which has been preselected for the positioning operation.

Each open-closed permutation of the four contacts *qa—qd* is translated into an analog value by a digital-to-analog network which includes ten resistors *r*1–*r*10 connected in series across the secondary 250 of a transformer 251 whose primary 252 is connected between the power lines 180 and 181. The turns ratio between primary 252 and secondary 250 is such as to impress, say, 10 volts across the network of resistors *r*1–*r*10. In this network the resistors *r*1–*r*10 have, in order, the relative resistance values 1, 2, 2, 5, 1, 2, 2, 5. The resistors *r*1 and *r*5 are respectively connected in parallel with a normally open pair of contacts QA1 and with a normally closed pair of contacts QA2. Both of these pairs of contacts are operated by the relay winding QA. In like manner, the resistors *r*2, *r*6 are, respectively, in parallel with the normally open and closed contacts, QB1, QB2, operated by winding QB, the resistors *r*3, *r*7 are respectively in parallel with the normally open and closed contacts QC1, QC2, operated by winding QC, and the resistors *r*4, *r*8 are respectively in parallel with the normally open and closed contacts QD1, QD2, operated by winding QD.

If none of windings QA, QB, QC, QD are energized, the resistors *r*5—*r*8 will be completely shorted out by the contacts QA2, QB2, QC2, QD2, such that the 10 volts which is impressed across the network of resistors from secondary 250 will appear entirely across the section of the network which includes resistors *r*1—*r*4. Hence, the junction 260 of resistors *r*4 and *r*5 will have a value of zero volts relative to the terminal 261 for the resistor network at the end thereof where resistor *r*8 is located. The total resistance value for the network will be 10 units, this figure representing the sum of the values 1, 2, 2, 5 which are the individual relative resistance values of the unshorted resistors *r*1—*r*4.

Assume now, that a given code group is read off from tape 70 (Fig. 3) to cause the contacts *qa* to close, but to cause the contacts *qb, qc, qd* to remain open. The closure of contacts *qa* energizes relay winding QA to produce a closing of contacts QA1 and a simultaneous opening of contacts QA2. The contacts QA1 by their closure short out the resistor *r*1 to thereby remove one unit of resistance from the total resistance appearing above junction 260 such that there are now nine units of resistance in all above this junction. The opening of the contacts QA2 operates in effect to insert resistor *r*5 into the otherwise shorted out section of network below junction 260 such that the one unit of resistance of resistor *r*5 now appears in the network below the junction. Since contacts QA2 insert into the network the same amount of resistance as is removed by contacts QA1, the total amount of resistance of the network remains unchanged. At the same time, the conjoint operation of contacts QA1 and QA2 changes the distribution of resistance above and below the junction 260 from a condition where there are 10 units above and none below the junction to a condition where there are 9 units of resistance above and 1 unit of resistance below the junction. It follows that one volt of the 10 volt voltage drop across the resistor network will appear between junction 260 and terminal 261.

By energizing appropriate ones of the windings QA, QB, QC and QD it is possible, in a manner alike to that just described, to produce a voltage at the junction 260 which, relative to the terminal 261, ranges in value in one-volt steps anywhere from zero volts to 10 volts. These different voltage values correspond with different quantitative values of displacement or position which are assigned to respective positioning operations by the code groups appearing on tape 70.

While the digital-to-analog network has been described by way of example as permitting selection of any one of ten different voltage values, it will be realized that in practice the network is usually designed to permit selection among a much larger number (as say, 100 or 1000) of voltage values which are separated from each other in order by unit voltage steps.

A voltage appearing at junction 260 may be converted into a displacement or position indication by any one of four servo-units CUL, CUT, VUL and VUT which are used in place of, respectively, the units CDL, CSL, the units CDT, CST, the units VDL, VSL and the units VDT, VST of Fig. 8. As shown in Fig. 9, an initial selection among these four servo-units is made by the relay winding FS. If, for any particular operation, this winding remains unenergized, then the contacts FS3, FS4, FS5 will remain closed while the contacts FS6, FS7, FS8 will remain open such that the two coarse measure units CUL and CUT are selected, and two Vernier measure servo-units VUL and VUT are eliminated from the selection. Conversely, if the relay winding FS is energized for a given positioning operation, the Vernier measure units VUL, VUT will be selected, and the coarse measure servo-units CUL and CUT will be eliminated from the selection. Thus, the fast-slow relay winding FS of itself permits selection to be made between the coarse measure units and the Vernier measure units.

Whatever the selection made by winding FS, this selection is further broken down by the longitudinal-transverse relay winding LT. Thus, considering the coarse measure units CUL and CUT, if for a particular positioning operation the winding LT remains unenergized, to indicate longitudinal movement, then the contacts LT19, LT20, LT21 will remain closed while the contacts LT22, LT23, LT24 remain open. This disposition of the mentioned contacts causes selection of the coarse measure, longitudinal servo-unit CUL in preference to the coarse measure, transverse movement unit CUT providing, of course, that this group of paired units has already been selected by the relay winding FS. Conversely, if winding LT is energized for a given positioning operation to indicate transverse movement, the unit CUT will be selected in preference to the unit CUL. In like manner, the winding LT is adapted to operate the contacts LT25—LT30 to selectively choose for operation one or the other of the Vernier measure servo-units VUL and VUT providing that the last-named group of paired units has already been selected for operation by the winding FS.

Assume now that the windings FS and LT have selected the coarse measure, longitudinal servo-unit CUL as the unit to be used in a particular positioning operation. As a result of this selection, the following events occur. First, a variable tap resistor 265 in the unit is connected across the network of resistors *r*1—*r*8 by a path through the contacts FS3 and the contacts LT19. Second, one of the two input terminals of a servo-amplifier 266 in the unit is connected to the junction 260 by a path through the contacts LT20 and the contacts FS4. Third, a servomotor 267 in the unit CUL is connected to power from the lines 180—181 by a path which includes the contacts LT21 and the contacts FS5.

Within the servo-unit CUL, the other input terminal to servo-amplifier 266 is connected to the tap 270 of resistor 265. This tap may be mechanically driven back and forth along resistor 265 by the servomotor 267. The servomotor 267 also provides by a shaft 271 a mechanical input to a single disc position indicating device 272 which will be later described in detail.

The coarse measure, longtudinal servo-unit CUL operates in the following manner. When the resistor 270 is, as described, connected across the network of resistors *r*1—*r*8, the effect is to form a bridge circuit wherein the portions of the network above and below junction 260 and the portions of resistor 265 above and below tap 270 are the four arms of the bridge. Any resistance unbalance of the bridge will be manifested as a proportional voltage appearing between junction 260 and tap 270. In the presence of such unbalance voltage, the servo-amplifier 266 will respond thereto to drive servomotor 267 until the srevomotor moves tap 270 an appropriate amount and in the appropriate direction to restore the bridge to balance. While the servomotor 267 is moving tap 270, the servomotor also drives position-indicating device 272 such that the direction and amount of movement thereof correspond to the direction and amount of movement given to tap 270. In this manner, the position-indicating device 272 is given an adjustment in accordance with the voltage appearing at junction 260. The value of this voltage is, as previously described determined by the open-closed permutation of the contacts *qa, qb, qc, qd* and this open-closed permutation is, in turn, determined by the presence-absence permutation presented by the quantity-indicating code holes of the code group which is controlling the positioning operation. Thus, quantitative positional information may be registered in digital form on tape by approprate code holes, and the information represented by these code holes can thereafter be translated by the device 272 into an analog displacement indication with which displacements occurring in the Fig. 1 machine may be compared.

Each of the other servo-units CUT, VUL and VUT will, when selected, operate in the same manner as that described for unit CUL to provide an analog displacement (position) indication, and the displacement so indicated is compared for stationing or probing purposes with the displacement actually occurring in the Fig. 1 machine in the course of a positioning operation.

Figure 11:
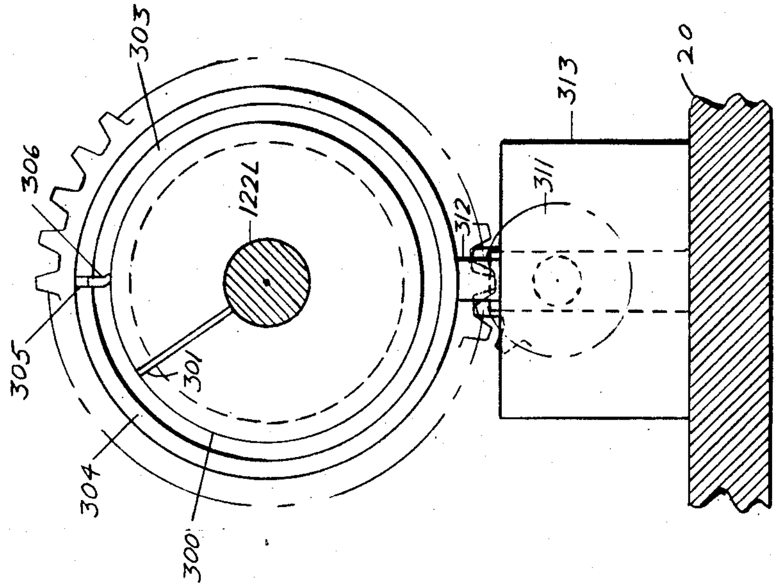
Fig. 11 is a front elevation view in cross-section taken as indicated by the arrows 11—11 in Fig. 10.
Figure 10:
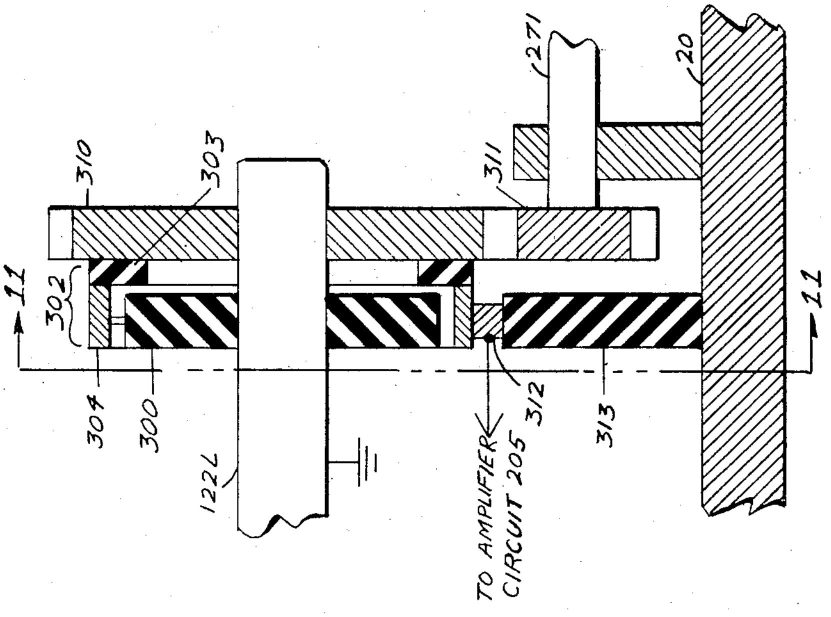
Fig. 10 is a side elevation view in cross-section of a portion of the Fig. 9 selector unit.

The structure of the position indicating device of the servo-unit CUL is shown in Figs. 10 and 11. As will be brought out by the following discussion, the structure of the device 272 and a single disc (as, say, the disc 132*a*) of the structure shown in Fig. 6 are similar in many respects. The two structures differ in the respect that the disc 132*a* of Fig. 6 is maintained at a selected angular position of adjustment throughout the entire program of positioning operations carried out by the Fig. 1 machine, whereas the analogous disc in device 272 is set to a different angular position for each positioning operation in which the servo-unit CUL is used.

In the device 272 the shaft 122L carries (in like manner to the structure of Fig. 6) a rotor 300 of insulating material which is radially slotted to receive a thin contact plate 301 in the slot. This rotor 300 is, as in the case of Fig. 6, encircled by a disc 302 consisting of an annular insulating ring 303 and a concentric annular conducting ring 304 having a radial slot 305 in which is received a contact whisker 306 which extends radially inward to slide over the peripheral surface of the insulating rotor 300. The principal differences between the structure shown in Figs. 10 and 11 and the Fig. 6 structure are to be found in the manner of mounting the disc and the manner in which electrical contact is made with the conducting ring. In the structure of Figs. 10 and 11, the disc 302 is carried by a gear 310 which is mounted on shaft 122L to be freely rotatable on the shaft but to be constrained from axial movement thereon. The gear 310 is driven by a pinion gear 311 which, in turn, is driven in rotation by a mechanical coupling of the pinion gear through the shaft 271 to the servomotor 267 (Fig. 9). Electric contact with the conducting ring 304 of disc 302 is made by means of brush 312 mounted by a pedestal 313 above the base 20.

The servomotor 267 in the servo-unit CUL will, in the course of balancing the bridge of the servo-unit, drive the disc 302 through shaft 271, pinion 311 and gear 310 to produce an amount of angular displacement of the whisker 306 from the "zero angle" of the contact plate 301. This amount of angular displacement represents, in the manner already described, the amount of angular displacement of the shaft 25L (Fig. 1) from its reference position which is required of the shaft for the particular positioning operation which is to be controlled by the servo-unit CUL. This positioning of the disc whisker takes place before the motor CDL is energized, as described. Once the motor is energized, the shaft 25L is rotated by the motor, and as the shaft moves, the contact plate 301 rotates until the plate reaches the whisker 306. At this time, an electric signal is produced in the same way as a signal is produced by contact plate 130 and whisker 137 in the Fig. 6 structure. This electric signal is supplied to the fast movement amplifier circuit 205 (Figs. 8 and 9) to cause termination of the angular movement of shaft 25L in the manner previously described.

In like manner, the position-indicating devices of the servo-units CUT, VUL and VUT may be used to compare displacement values which are preselected for various positioning operations with the displacements actually occurring in the Fig. 1 machine during these positioning operations. As in the case of the disc stacks, the single-disc position indicating devices of the servo-units CUL and CUT are utilized only in connection with stationing operations whereas the single-disc devices of the servo-units VUL, VUT may be used either during stationing operations or during probing operations.

A single-disc structure of the type shown in Figs. 10 and 11 permits photographic recording of the results obtained by probing operations. If, for example, a longitudinal probing operation is taking place, an electric signal will be produced by the position-indicating device of servo-unit VUL when the rotating contact plate of this device reaches the whisker thereof. This electric signal may be used to cause an image of the instantaneous angular position of the contact plate to be exposed upon the film of a camera which automatically advances its film by one frame after each exposure. The camera is again actuated in response to the electric signal, produced upon occurrence of contact between ball 55 and part 50, to record the instantaneous angular position of the mentioned rotating contact plate at the time of occurrence of the last-named contact. The angular difference between the two photographically recorded positions of the contact plate will be a measure of the amount of departure of the gauged area of part 50 from a preselected tolerance value for this area. Alternatively, the shaft which moves the insulating rotor of the position-indicating device may be used as an input to a counter means as, say, a mechanical counter, and the camera may be actuated by the mentioned electric signals to photographically record the reading of this counter once when the contact plate of the position-indicating device reaches the whisker of the device, and again when the ball 55 makes contact with the part 50.

It will be understood that the foregoing description applies only to representative embodiments of the invention, and that, accordingly, the invention comprehends embodiments differing in form or detail from the above-described embodiments. For example, a pair of discs may be used in a probing operation to indicate the dimensional condition of a gauged area of part 50 in relation to two preselected tolerance values, as, say, a maximum tolerance and a minimum tolerance, instead of in relation to only one tolerance value. Also, the system described herein may be modified to provide a disc indication of position during stationing or positioning operations in the vertical dimension as well as in the longitudinal and transverse dimensions. Accordingly, the invention is not to be considered as limited save as is consonant with the scope of the following claims.

We claim:

1. Apparatus to effect operations which position a mechanical element in relation to a workpiece in accordance with a preselected program of positioning operations, said apparatus comprising, carriage means mounting said element in proximity to said workpiece, a plurality of selectively operable drive means respectively adapted to move said carriage means in a plurality of different coordinates defining dimensions of said workpiece, a plurality of contactor means each having variably separable electrical contacts and each being responsive to an input of motion originally developed by a respective one of said drive means to bring said contacts thereof together to closure by relative movement between said contacts which simulates the movement given to said carriage means by the associated drive means, said contacts of each contactor means being adjustable in separation to permit presetting before said relative movement of a relative displacement between said contacts which represents a corresponding programmed displacement of said carriage means, a plurality of selectively operable electric circuits respectively responsive to closure of said respective contacts in said plurality of contactor means to produce electric signals respectively indicating that said carriage means has undergone programmed displacements represented by presettings of said contactor means, a programming member supplying at least part of the program in the form of successive digital indications on the member, said indications being coded to selectively designate respective movements of said carriage means in said different coordinates, code translator means adapted by relative step-by-step movement of said programming member therewith to have said digital indications on said member presented thereto seriatim, and to translate each presented indication into electric control signals serving to select for operation and to render operable the drive means and electric circuit corresponding to the movement designated by the presented digital indication, and means responsive to the electric indicating signal produced by the circuit so selected to relatively step said programming member and said code translator means to present the next digital indication to said translator means, said program of positioning operations being thereby carried out step by step by said apparatus.

2. Apparatus as in claim 1 wherein at least one of said drive means is selectively operable to move said carriage means forward and backward in the corresponding coordinate, at least some of the digital indications are coded to selectively designate said forward and backward movement, and said translator means translates each such presented digital indication into electric control signals which serve inter alia to render the said drive means operable to produce said forward and backward movement as designated by the presented indication.

3. Apparatus to effect operations which position a mechanical element in relation to a workpiece in accordance with a preselected program of positioning operations, said apparatus comprising, carriage means mounting said element in proximity to said workpiece, drive means selectively operable to move said carriage means in at least one coordinate defining a dimension of said workpiece, first and second contactor means each having variably separable electric contacts and each being responsive to a respective input of motion originally developed by said drive means to bring their said respective contacts together to closure by relative movements which, in the instance of said first and said second contactor means, respectively simulate to a relatively less and a relatively more accurate degree the movement given to said carriage means by said drive means, said contacts of each contactor means being adjustable in separation to permit presetting before said relative movement of a relative displacement between said contacts which represents a corresponding programmed displacement of said carriage means, a pair of selectively operable electric circuits respectively responsive to closure of said respective contacts in said first and second contactor means to produce electric signals respectively indicating approximately and exactly when said carriage means has undergone programmed displacements represented by presettings of said contactor means, a programming member supplying at least part of the program in the form of successive digital indications on the member, said indications being coded to selectively designate that said drive means is to be operated and to selectively designate one of said circuits to provide an electric signal indication in the course of such movement, code translator means adapted by relative step-by-step movement of said programming member therewith to have said digital indications on said member presented thereto seriatim, and to translate each presented indication into electric control signals serving to render said drive means operable to produce movement of said carriage means as designated by the presented indication, and to render operable the one of said circuits designated by the presented indication, and means responsive to the electric indicating signal produced by the circuit so rendered operable to relatively step said programming member and said code translator means to present the next digital indication to said translator means, said program of positioning operations being thereby carried out step by step by said apparatus.

4. Apparatus as in claim 3 wherein said drive means is selectively operable to move said carriage means at a fast rate and at a slow rate, at least some of said digital indications are coded to selectively designate said fast and said slow rate of movement, and said translator means translates each such presented digital indication into electric control signals which serve inter alia to render said drive means operable to produce said carriage movement at said fast rate and at said slow rate as designated by the presented indication.

5. Apparatus adapted to determine the respective dimensional conditions of local areas of a workpiece by stationing a gauging element in relation to said workpiece and by probing said workpiece with said gauging element in accordance with a preselected program of stationing and probing operations, said apparatus comprising, carriage means mounting said element in proximity to said workpiece, selectively operable drive means to move said carriage means in at least one coordinate defining a dimension of said workpiece, contactor means having variably separable contacts and being responsive to an input of motion originally developed by said drive means to bring said contacts together by relative movement which simulates the movement given to said carriage means by said drive means, said contacts being adjustable in separation to permit setting of a relative displacement between said contacts which represents a corresponding programmed displacement of said carriage means, a first electric indicating circuit responsive to closure of said contacts to produce a first electric signal indicating when said carriage means has undergone a programmed displacement represented by a setting of said contactor means, a second electric circuit responsive to a change between a disengaged and engaged condition of said workpiece and gauging element to produce a second electric signal indicating when said change occurs, register means responsive to said first and second signals to convert the time difference therebetween into an indication of a dimensional condition of the local area of said workpiece engaged by said element, a third electric circuit operable in a selective manner to route said first signal to said register means and to said drive means to terminate the operation thereof, a programming member supplying at least part of the program in the form of successive digital indications on the member, said indications being coded to selectively designate a routing of said first signal to said drive means for a stationing operation and to said register means for a probing operation, code translator means adapted by relative step-by-step movement of said programming member therewith to have said digital indications on said member presented thereto seriatim, and to translate each presented indication into electric control signals serving to render said drive means operable and said third circuit operable to route said first signal as designated by the presented indication, and means responsive to said first and second signals during, respectively, a stationing and a probing operation to relatively step said programming member and said code translator means to present the next digital indication to said translator means, said program of stationing and probing operations being thereby carried out step by step by said apparatus.

6. Apparatus adapted to determine the respective dimensional conditions of local areas of a workpiece by stationing a gauging element in relation to said workpiece and by probing said workpiece with said gauging element in accordance with a preselected program of stationing and probing operations, said apparatus comprising, carriage means mounting said element in proximity to said workpiece, a plurality of selectively operable drive means to move said carriage means in a plurality of coordinates defining dimensions of said workpiece, a plurality of contactor means each having variably separable electrical contacts and each being responsive to an input of motion originally developed by a respective one of said drive means to bring said contacts thereof together to closure by relative movement between said contacts which stimulates the movement given to said carriage means by the associated drive means, said contacts of each contactor means being adjustable in separation to permit setting of a relative displacement between said contacts which represents a corresponding programmed displacement of said carriage means, a plurality of selectively operable first electric indicating circuits respectively responsive to closure of said respective contacts in said plurality of contactor means to produce first electric signals respectively indicating that said carriage has undergone programmed displacements represented by settings of said contactor means, a second electric indicating circuit responsive to a change between a disengaged and engaged condition of said workpiece and gauging element to produce a second electric signal indicating when said change occurs, register means responsive to a first signal from one of said first circuits and to said second signal to convert the time difference therebetween into an indication of a dimensional condition of the local area of said workpiece engaged by said element, a plurality of third electric circuits each selectively operable to route the first signal of a respective one of said first circuits in a selective manner to said register means and to the drive means associated with such first circuit to terminate the operation of such drive means, a programming member supplying at least part of the program in the form of successive digital indications on the member, said indications being coded to selectively designate the drive means and associated first and third circuits to be used for a positioning operation and to designate routing by the designated third circuit of its received first signal to the designated drive means and to said register means when said positioning operation is, respectively, a stationing operation and a probing operation, code translator means adapted by relative step-by-step movement of said programming member therewith to have said digital indications on said member presented thereto seriatim, and to translate each presented indication into electric control signals serving to render operable the drive means, first circuit and third circuit designated by the presented indication and to produce routing by the last-named third circuit as designated by the presented indication, and means responsive to said first and second signals during, respectively, a stationing and a probing operation to relatively step said programming member and said code translator means to present the next digital indication to said translator means, said program of stationing and probing operations being thereby carried out step by step by said apparatus.

7. Apparatus as in claim 6 in which each of said drive means has a first and second one of said contactor means which are respectively associated therewith and which are each responsive to an input of motion originally developed by such drive means to bring their said respective contacts together to closure by relative movements which, in the instance of said first and said second contactor means, respectively simulate to a relatively less and a relatively more accurate degree the movement given to said carriage means by such drive means, said first and second contactor means have respectively associated therewith first and second ones of said first electric indicating circuits, the respective signals of said first and second ones of said last-named circuits indicating programmed displacements to an approximate value and to an exact value, and in which said digital indications on said programming member are adapted to select one and the other for operation among said first contactor means together with its associated indicating circuit and said second contactor means together with its associated indicating circuit.

8. Apparatus as in claim 7 in which each of said drive means is selectively controllable by control signals from said translator means to move said carriage means forward and backward in a respective coordinate, and in which said digital indications on said programming member selectively designate forward and backward movement for the last-named drive means.

9. Apparatus as in claim 8 in which each of said drive means is selectively controllable by control signals from said translator means to move said carriage means at a fast rate and at a slow rate and in which said digital indications on said programming member selectively designate fast and slow movement for said carriage means.

10. Apparatus adapted to determine the respective dimensional conditions of local areas of a workpiece by stationing a gauging element in relation to said workpiece and by probing said workpiece with said gauging element in accordance with a preselected program of stationing and probing operations, said apparatus comprising, carriage means mounting said element in proximity to said workpiece, selectively operable drive means to move said carriage means in at least one coordinate defining a dimension of said workpiece, first and second contactor means each having variably separable electric contacts and each being responsive to a respective input of motion originally developed by said drive means to bring their said respective contacts together to closure by relative movements which, in the instance of said first and said second contactor means, respectively simulate to a relatively less and a relatively more accurate degree the movement given to said carriage means by said drive means, said contacts of each contactor means being adjustable in separation to permit setting of a relative displacement between said contacts which represents a corresponding programmed displacement of said carriage means, a pair of first electric circuits which are selectively operable and which when operable are respectively responsive to closure of said contacts in said first and second contactor means to produce first electric signals respectively indicating approximately and exactly when said carriage means has undergone programmed displacements represented by settings of said contactor means, a second electric circuit responsive to a change between a disengaged and engaged condition of said workpiece and gauging element to produce a second electric signal indicating when said change occurs, register means responsive to said first and second signals to convert the time difference therebetween into an indication of a dimensional condition of the local area of said workpiece engaged by said element, a pair of third electric circuits respectively associated with said pair of first circuits and each operable in a selective manner to route the first signal of the associated first circuit to said register means and to said drive means to terminate the operation thereof, a programming member supplying at least part of the program in the form of successive digital indications on the member, said indications being coded to designate operation in a selective manner of said first contactor means together with its associated first and third circuits and said second contactor means together with its associated first and third circuits, and to further designate in a selective manner a routing by the designated third circuit of the first signal received thereby to the designated drive means and to said register means for, respectively, a stationing operation and a probing operation, code translator means adapted by relative step-by-step movement of said programming member therewith to have said digital indications on said member presented thereto seriatim, and to translate each presented indication into electric control signals serving to render said drive means operable and to render operable one of said contactor means and associated first and third circuits as designated by the presented indication, and serving to produce routing of the signal received by the last-named third circuit as designated by the presented indication, and means responsive to said first and second signals during, respectively, a stationing and a probing operation to relatively step said programming member and said code translator means to present the next digital indication to said translator means, said program of stationing and probing operations being thereby carried out step by step by said apparatus.

11. Apparatus to effect operations which position a mechanical element in relation to a workpiece in accordance with a preselected program of positioning operations, said apparatus comprising, carriage means mounting said element in proximity to said workpiece, selectively operable drive means to move said carriage means in at least one coordinate defining a dimension of said workpiece, contactor means having variably separable contacts and being responsive to an input of motion originally developed by said drive means to bring said contacts together by relative movement which simulates the movement given to said carriage means by said drive means, said contacts being adjustable in separation to permit plural settings of said contactor means of relative displacements between said contacts which represent corresponding programmed displacements of said carriage means, a first circuit responsive to closure of said contacts to produce a first electric signal indicating when said carriage means has undergone a programmed displacement represented by a setting of said contactor means, a programming member supplying at least part of the program in the form of successive digital indications on the member designating positioning operations each of which requires a preselected programmed displacement of said carriage means, code translator means adapted by relative step-by-step movement of said programming member therewith to have said digital indications on said member presented thereto seriatim, and to translate each presented indication into electric control signals serving to render said drive means operable to move said carriage means through the displacement which has been programmed therefor, and means responsive to each first signal produced upon movement of said carriage means through a programmed displacement in a positioning operation designated by a presented digital indication to relatively step said programming member and said code translator means to present the next digital indication to said translator means.

12. Apparatus as in claim 11 in which at least some of the indications provided by said first circuit are indications of programmed displacements of said carriage means which bring said carriage means to positions which are translatable into reference positions in said coordinate for local areas of said workpiece.

13. Apparatus as in claim 11 in which said contactor means comprises a first contact driven in angular movement about an axis therefor by said motion input to said contactor means, said first contact having extent along said axis, a plurality of circular members concentric with said axis and mutually spaced along the axis thereof opposite said extent of said first contact, support means mounting said members to be individually angularly adjustable about said axis, a plurality of second contacts respectively carried by said members to be angularly adjustable therewith and to be disposed in the angular path of movement of said first contact so as to be closable therewith, and switch means responsive to control signals from said translator means to connect said second contacts seriatim into operative relation in said first circuit with said first contact.

14. Apparatus as in claim 11 in which said contactor means comprises a first contact driven in angular movement about an axis therefor by said motion input to said contactor means, a circular member concentric with and angularly movable about said axis in proximity to said first contact, and a second contact carried by said member to be angularly movable therewith and to be disposed in the path of angular movement of said first contact so as to be closable therewith, said apparatus further comprising, a programming member wherein said digital indications thereon include coded indications designating the amount of angular movement to be given to said second contact, digital-to-analog converter means responsive to said coded indications to produce an analog electric signal having an analog value representing said amount of movement, and electromechanical means responsive to said analog signal to angularly move said circular member and second contact by said amount.

15. Apparatus to indicate preselected angular displacements of a shaft, said apparatus comprising, a first contact movable with said shaft about the axis thereof and having extent along said axis, a plurality of circular members concentric with said shaft and mutually spaced along the axis thereof opposite said extent of said first contact, support means mounting said members to be individually angularly adjustable about said axis, a plurality of second contacts respectively carried by said members to be angularly adjustable therewith and to be disposed in the angular path of movement of said first contact so as to be closable therewith, an electric circuit responsive to closure of said first contact and one of said second contacts to produce an electric signal indicating when said closure has occurred, and switch means adapted to connect said second contacts seriatim into operative relation in said circuit with said first contact.

16. Apparatus as in claim 15 in which said circular members are in the form of annular discs encircling said first contact, and in which said second contacts project radially inward from said discs.

17. Apparatus as in claim 16 in which the support means for said annular discs comprises a plurality of shoes respectively providing seats for said discs, and a plurality of resilient band means passing about peripheral portions of respective ones of said discs and exerting pressure thereon to maintain said discs in said seats while permitting individual angular adjustment of said discs in said seats.

18. Apparatus to indicate successive preselected angular displacements of a shaft, said apparatus comprising, a first contact carried by said shaft to be angularly movable therewith, a circular member concentric with said shaft and angularly movable about the axis thereof in proximity to said first contact, a second contact carried by said member to be angularly movable therewith and disposed in the path of angular movement of said first contact so as to be closable therewith, an electric circuit responsive to closure of said contacts to produce an electric signal indicating when said closure has occurred, a programming member supplying a program in the form of successive coded indications which digitally designate said preselected displacements, digital-to-analog converter means responsive seriatim to said coded indications to produce for each coded indication an electric signal having an analog value representing the amount of displacement represented by the last-named indication, and electromechanical means responsive to said analog signal to angularly move said circular member and said contact by said amount.

19. Apparatus as in claim 18 in which said analog-to-digital converter network comprises a resistance bridge, means responsive to each coded indication to redistribute the resistance in said bridge to thereby produce said analog signal as an unbalance signal of said bridge, and in which said electromechanical means comprises a servomotor mechanically coupled to said bridge and to said circular member, said servomotor being responsive to said bridge unbalance signal to rebalance said bridge and to concurrently move said circular member and second contact angularly in accordance with the value of said bridge unbalance signal.

20. Apparatus as in claim 18 in which said circular member comprises an annular disc encircling said first contact, and in which said second contact projects radially inward from said disc.

21. Gauging apparatus comprising, a movable carriage, a probe thereon, a motor to impart to said carriage successive probing movements impelling said probe to approach and engage, one after another, a plurality of local areas of a workpiece to be gauged, an electric contact which is movable in a path and which is synchronized in movement with said carriage to represent by instantaneous position the instantaneous position of said carriage, adjustable electric contact means, said means being adjusted to positions in said path to define thereby the respective positions of said movable contact which correspond to the positions in said probing movement that said carriage would occupy upon engagement of the probe with the local areas approached thereby if the said areas were of pre-established standardized dimensional values, programming means to provide successive position-selecting signals respectively indicating the said positions of said adjustable contact means which correspond to said successive probing movements, electromechanical means responsive to said position-selecting signals to render said adjustable contact means successively cooperable electrically with said movable contact at one after another of said positions of said adjustable contact means, said movable contact closing with said adjustable contact means at the last-named positions thereof to thereby develop first electric signals respectively indicating in said movements the said defined positions for said movable contact, electric circuit means responsive to the respective engagements of said probe with said local areas to indicate the occurrence of said engagements by respective second electric signals, and signal registering means which is synchronized with the motion of said carriage to accompany the probing movements thereof by corresponding progressive changes of condition, and which is responsive to said first and second signals to provide indications of the instantaneous condition assumed thereby during said probing movements at the times of said signals, the indications so derived from said first signals and second signals defining, respectively, a profile of standardized dimensional values for said workpiece and a profile of the actual dimensional values of said workpiece.

22. Gauging apparatus comprising, a movable carriage, a probe thereon, a motor to impart to said carriage successive probing movements impelling said probe to approach and engage, one after another, a plurality of local areas of a workpiece to be gauged, an electric contact which is movable in a path and which is synchronized in movement with said carriage to represent by instantaneous position the instantaneous position of said carriage, an adjustable electric contact adapted to be successively preadjusted in position to define for each such probing movement the position of said movable contact which corresponds to the position in that probing movement which said carriage would occupy upon engagement of the probe with the local area approached thereby if the last-named area were of a pre-established standardized dimensional value, said movable contact closing with said adjustable contact during said probing movements to thereby develop first electric signals respectively indicating the positions so defined in said movements, programming means to provide successive position-selecting signals which respectively designate the successive positions to which said adjustable contact is to be preadjusted, electromechanical means responsive to said position-selecting signals to set said adjustable contact to the successive positions designated therefor, electric circuit means responsive to the respective engagements of said probe with said local areas to indicate the occurrence of said engagements by respective second electric signals, and a signal registering means which is synchronized with the motion of said carriage to accompany the probing movements thereof by corresponding progressive changes of condition, and which is responsive to said first and second signals to provide indications of the instantaneous condition assumed thereby during said probing movements at the times of said last-named signals, the indications so derived from said first signals and second signals defining, respectively, a profile of standardized dimensional values for said workpiece and a profile of the actual dimensional values of said workpiece.

References Cited in the file of this patent

UNITED STATES PATENTS

| | | |
|---|---|---|
| 2,393,492 | Yardeny | Jan. 22, 1946 |
| 2,449,765 | Brattain | Sept. 21, 1948 |
| 2,570,405 | Tandler | Oct. 9, 1951 |
| 2,628,539 | Neergaard | Feb. 17, 1953 |
| 2,748,665 | Senn | June 5, 1956 |
| 2,764,039 | Black | Sept. 25, 1956 |